(12) United States Patent
Onizuka et al.

(10) Patent No.: US 11,399,227 B2
(45) Date of Patent: Jul. 26, 2022

(54) WIRELESS EARPHONE CHARGER, WIRELESS EARPHONE AND WIRELESS EARPHONE SYSTEM

(71) Applicant: AUDIO-TECHNICA CORPORATION, Tokyo (JP)

(72) Inventors: Kazuhiro Onizuka, Tokyo (JP); Yasuyuki Morimoto, Kanagawa (JP); Takashi Nara, Kanagawa (JP)

(73) Assignee: AUDIO—TECHNICA CORPORATION, Tokyo (JP)

( * ) Notice: Subject to any disclaimer, the term of this patent is extended or adjusted under 35 U.S.C. 154(b) by 0 days.

(21) Appl. No.: 17/261,373

(22) PCT Filed: May 9, 2019

(86) PCT No.: PCT/JP2019/018589
§ 371 (c)(1),
(2) Date: Jan. 19, 2021

(87) PCT Pub. No.: WO2020/017128
PCT Pub. Date: Jan. 23, 2020

(65) Prior Publication Data
US 2021/0289282 A1 Sep. 16, 2021

(30) Foreign Application Priority Data
Jul. 20, 2018 (JP) .............................. JP2018-136863

(51) Int. Cl.
*H04R 1/10* (2006.01)
*H02J 50/10* (2016.01)
(Continued)

(52) U.S. Cl.
CPC .......... *H04R 1/1025* (2013.01); *H02J 7/0044* (2013.01); *H02J 7/0047* (2013.01);
(Continued)

(58) Field of Classification Search
CPC ...... H04R 1/1025; H04R 1/02; H04R 1/1016; H04R 2420/07; H02J 50/10; H02J 7/0044; H02J 7/0047; H02J 7/02
See application file for complete search history.

(56) References Cited

U.S. PATENT DOCUMENTS 7,426,282 B1 * 9/2008 Poss ......................... H04R 5/02
381/160
10,129,626 B1 * 11/2018 Jung ....................... H02J 7/342
(Continued)

FOREIGN PATENT DOCUMENTS

CN 205681594 U 11/2016
JP 2006-059047 A 3/2006
(Continued)

*Primary Examiner* — Jason R Kurr
(74) *Attorney, Agent, or Firm* — WC&F IP

(57) ABSTRACT

Provided are a wireless earphone charger, a wireless earphone, and a wireless earphone system that improve visibility and design of an indicator of the charger.
The wireless earphone charger 3 is configured to charge a wireless earphone including a receiving circuit 141, 241 configured to receive a sound signal via a wireless communication line, and an earphone rechargeable battery 15, 25 configured to charge power to be supplied to the receiving circuit. The wireless earphone charger includes a rechargeable battery 35 configured to charge power to be supplied to the earphone rechargeable battery, an indicator 34A configured to indicate a plurality of indication modes, and a controller 39 configured to switch the indication modes. The indication modes of the indicator include a first indication mode for indicating a remaining power of the rechargeable battery, and a second indication mode for indicating a remaining power of the earphone rechargeable battery. The indicator indicates only one of the indication modes.

11 Claims, 15 Drawing Sheets

(51) Int. Cl.
   *H02J 7/00*       (2006.01)
   *H02J 7/02*       (2016.01)
   *H04R 1/02*       (2006.01)

(52) U.S. Cl.
   CPC ................ *H02J 7/02* (2013.01); *H02J 50/10* (2016.02); *H04R 1/02* (2013.01); *H04R 1/1016* (2013.01); *H04R 2420/07* (2013.01)

(56) References Cited

U.S. PATENT DOCUMENTS

| | | | |
|---|---|---|---|
| 2014/0275834 | A1 | 9/2014 | Bennett |
| 2015/0304757 | A1 | 10/2015 | Kim et al. |
| 2017/0064429 | A1 | 3/2017 | Hirsch et al. |
| 2017/0064433 | A1* | 3/2017 | Hirsch .............. H04W 52/0229 |
| 2017/0195466 | A1 | 7/2017 | Chen |
| 2019/0081499 | A1* | 3/2019 | Sun ......................... H02J 50/80 |
| 2019/0386498 | A1* | 12/2019 | Higgins ................. H04R 25/30 |

FOREIGN PATENT DOCUMENTS

| | | | |
|---|---|---|---|
| JP | 2006-074384 A | 3/2006 |
| JP | 2006-320154 A | 11/2006 |
| JP | 2011-193656 A | 9/2011 |
| JP | 2017-034702 A | 2/2017 |
| JP | 2017-093250 A | 5/2017 |
| JP | 2017-099259 A | 6/2017 |

* cited by examiner

| Charger / Earphone | Remaining power (%) | Indication mode ||
|---|---|---|---|
| | | Indication pattern | Indication color |
| Charger | 0-30 | ● ○ ○ | Blue |
| | 30-60 | ● ● ○ | |
| | 60-100 | ● ● ● | |
| | 100 (fully charged) | ● ● ● | |
| Earphone | 0-30 | ○ ○ ○ | White |
| | 30-60 | ○ ○ ○ | |
| | 60-100 | ○ ○ ○ | |
| | 100 (fully charged) | ○ ○ ○ | |

FIG. 7

| Charger / Earphone | Remaining power (%) | Indication mode | |
|---|---|---|---|
| | | Indication pattern | Indication color |
| Charger | 0-30 | ◉ ○ ○ | Blue |
| | 30-60 | ● ◉ ○ | |
| | 60-100 | ● ● ◉ | |
| | 100 (fully charged) | ● ● ● | |
| Earphone | 0-30 | ○ ○ ○ | White |
| | 30-60 | ○ ○ ○ | |
| | 60-100 | ○ ○ ○ | |
| | 100 (fully charged) | ○ ○ ○ | |

FIG. 8

WIRELESS EARPHONE CHARGER, WIRELESS EARPHONE AND WIRELESS EARPHONE SYSTEM

TECHNICAL FIELD

The present invention relates to a wireless earphone charger, a wireless earphone, and a wireless earphone system.

BACKGROUND ART

Recently, wireless type earphones (hereinafter, referred to as "wireless earphones") without a cord for connecting to a sound source have been commercially available. Generally, a wireless earphone includes a pair of right and left sound emitting units. The wireless earphone receives a sound signal from a sound source such as a portable music player, for example, via a wireless communication line such as Bluetooth (registered trademark). The wireless earphone includes a wireless earphone in which left and right sound emitting units are connected by a cable, and what is called a complete wireless earphone in which left and right sound emitting units are completely independent (the left and right sound emitting units are not connected by a cable).

The wireless earphone is not physically connected to the sound source via a cord, as described above. Therefore, the wireless earphone cannot receive power from the sound source in use. Thus, each sound emitting unit is provided with a rechargeable battery for charging power from an external power and supplying power to a plurality of components (electronic components) of the wireless earphone.

As a charging method of a wireless earphone rechargeable battery, a charging method in which a housing case used for housing or carrying a wireless earphone is used as a charger has been proposed (for example, see CN 205681594 U.)

The charger disclosed in CN 205681594 U includes a rechargeable battery and a light emitter. The rechargeable battery charges power from an external power source, and supplies power to a rechargeable battery within the wireless earphone (hereinafter, referred to as "earphone rechargeable battery"). The light emitter emits light corresponding to a remaining power of the rechargeable battery, a charging state of the rechargeable battery (whether charging is in progress), and a charging state of the earphone rechargeable battery (whether charging is in progress) when the wireless earphone is being charged. A user can identify a state of the charger or the wireless earphone by visually recognizing light emission modes of the light emitter. In such a charger, if the user can recognize the remaining power of the earphone rechargeable battery (the charging amount of the earphone rechargeable battery) even when the wireless earphone is housed in the charger, the convenience of the user is improved.

A charger that enables the user to recognize the remaining power of the earphone rechargeable battery with the light emission modes of the light emitter when the wireless earphone is housed in the charger has been proposed (e.g., see JP 2017-99259 A).

The charger (a case) disclosed in JP 2017-99259 A includes a rechargeable battery and a plurality of light emitters. One of the light emitters emits light in a color corresponding to the remaining power of the rechargeable battery, so that an indicator indicates the remaining power. Another light emitter emits light in a color corresponding to the remaining power of the earphone rechargeable battery, so that the indicator indicates the remaining power. Therefore, the charger disclosed in JP 2017-99259 A, simultaneously indicates information on power such as the remaining power of the rechargeable battery within the charger or the earphone rechargeable battery on the indicator when the wireless earphone is housed in the case to enable the user to recognize the information.

However, in order to enable the user to recognize the charging state and the remaining power of each of the rechargeable battery within the charger and the earphone rechargeable battery, when a plurality of light emitters provided in the charger emit light simultaneously and in a plurality of colors, the user cannot instantly recognize information on power, and accordingly the visibility and design of the indicator of the charger deteriorate.

SUMMARY OF INVENTION

Technical Problem

An object of the present invention is to solve the problem in related art as described above and to improve visibility and design of an indicator of a charger.

Solution to Problem

A wireless earphone charger according to the present invention is configured to charge a wireless earphone including a receiving circuit configured to receive a sound signal via a wireless communication line, and an earphone rechargeable battery configured to charge power to be supplied to the receiving circuit. The wireless earphone charger includes a rechargeable battery configured to charge power to be supplied to the earphone rechargeable battery, an indicator configured to indicate a plurality of indication modes, and a controller configured to switch the indication modes. The indication modes of the indicator include a first indication mode for indicating a remaining power of the rechargeable battery, and a second indication mode for indicating a remaining power of the earphone rechargeable battery. The indicator indicates only one of the indication modes.

Advantageous Effects of Invention

According to the present invention, the present invention improves visibility and design of the indicator of a charger.

BRIEF DESCRIPTION OF DRAWINGS

FIG. 2A is a rear view of the left sound emitting unit, and FIG. 2B is a rear view of the right sound emitting unit.

FIG. 7 is a schematic diagram illustrating an indication mode of the indicator of the wireless earphone charger when a power supply cable is not connected to the wireless earphone charger.

FIG. 8 is a schematic diagram illustrating an indication mode of the indicator of the wireless earphone charger when the power supply cable is connected to the wireless earphone charger.

DESCRIPTION OF EMBODIMENTS

Embodiments of a wireless earphone charger, a wireless earphone, and a wireless earphone system according to the present invention will now be described below with reference to the attached drawings.

Wireless Earphone System

A wireless earphone system according to the present invention (hereinafter, referred to as the "present system") will now be described. The system includes a wireless earphone according to the present invention (hereinafter, referred to as the "present earphone") and a wireless earphone charger according to the present invention (hereinafter, referred to as the "present charger").

Configuration of Wireless Earphone System

Figure 1:
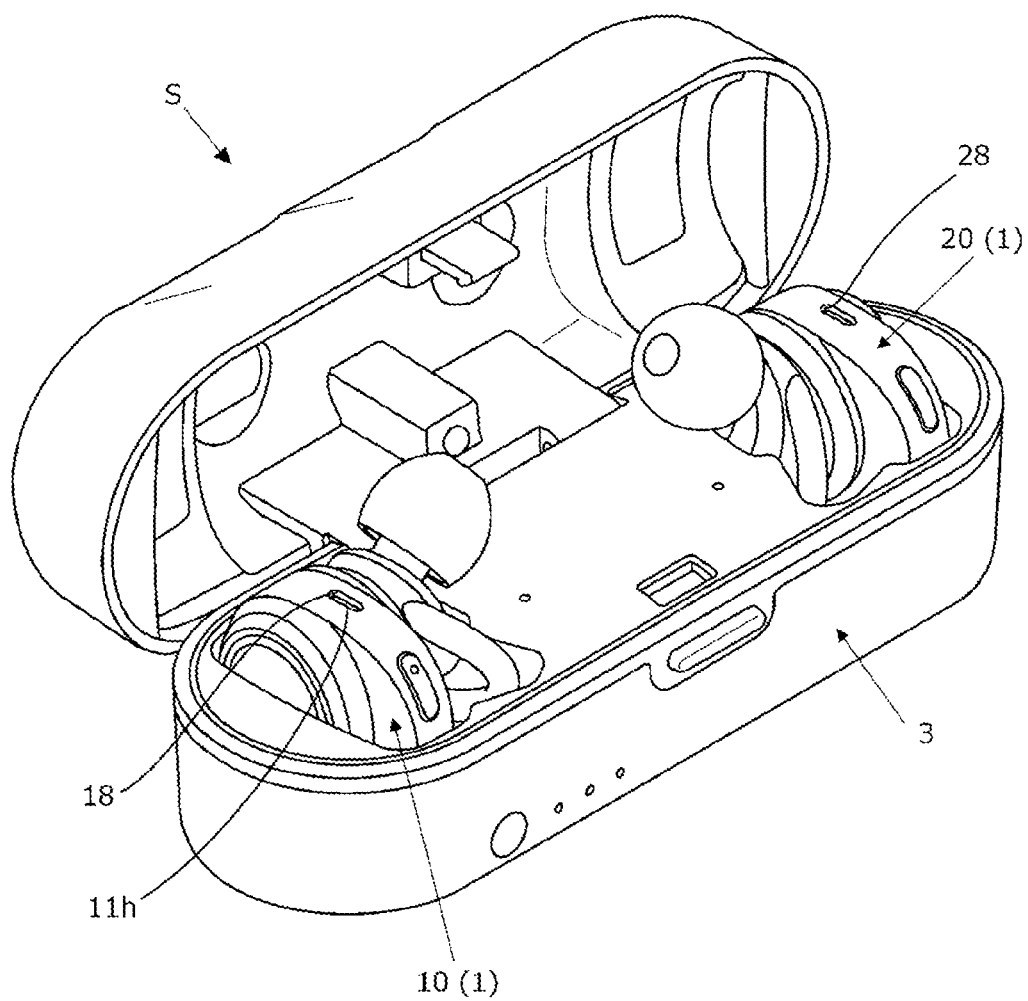
FIG. 1 is a perspective view illustrating an exemplary embodiment of a wireless earphone system according to the present invention.

FIG. 1 is a perspective view illustrating an exemplary embodiment of the present system.

FIG. 1 illustrates a state in which the present earphone 1 constituting the present system S is housed in the present charger 3 constituting the present system S, and a lid (part) of the present charger 3 is opened.

The present earphone 1 includes a left sound emitting unit 10 and a right sound emitting unit 20. The present system S houses the present earphone 1 (the left sound emitting unit 10 and the right sound emitting unit 20) in the present charger 3. The present charger 3 charges the present earphone 1.

Wireless Earphone

The wireless earphone according to the present invention will now be described.

Configuration of Wireless Earphone

Figure 2A:
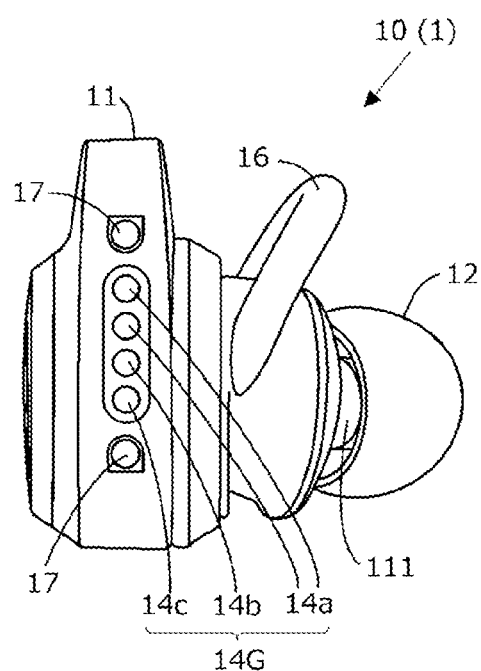
FIGS. 2A and 2B are a rear view illustrating an exemplary embodiment of the earphone.
Figure 2B:
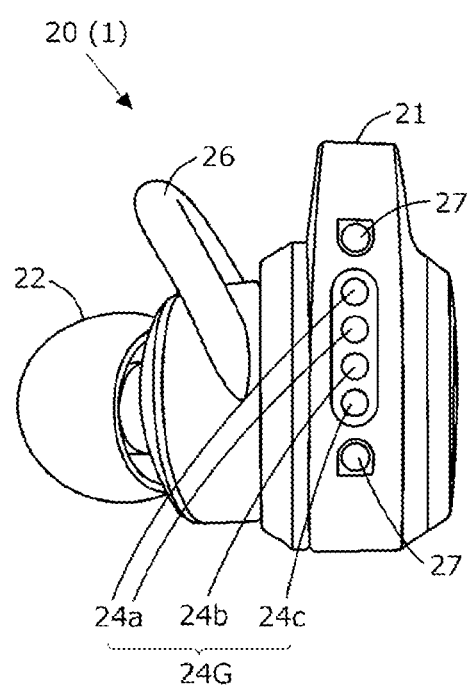

FIGS. 2A and 2B are a rear view illustrating an exemplary embodiment of the present earphone 1: FIG. 2A is a rear view of the left sound emitting unit 10, and FIG. 2B is a rear view of the right sound emitting unit 20.

Figure 3:
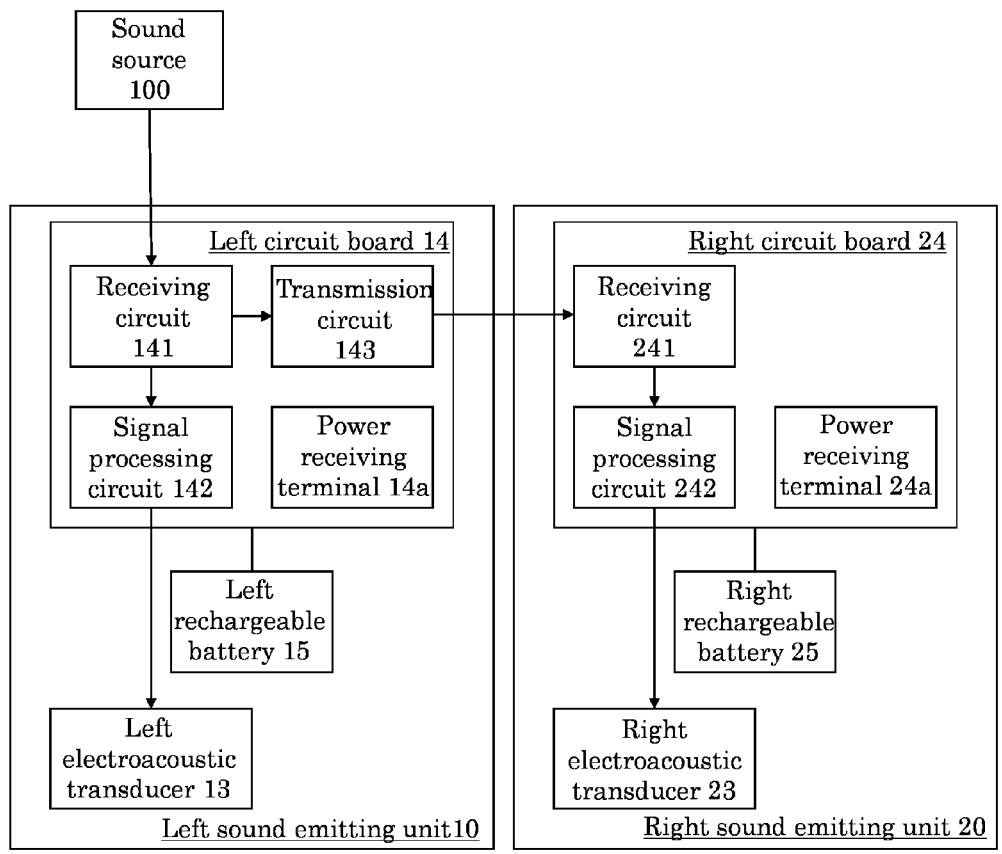
FIG. 3 is a functional block diagram of the wireless earphone of FIGS. 2A and 2B.

FIG. 3 is a functional block diagram of the present earphone 1.

The present earphone 1 is worn on an ear of a user of the present earphone 1 and outputs sound wave corresponding to a sound signal from a sound source 100 such as a portable music player. The present earphone 1 receives the sound signal from the sound source 100 via a wireless communication line such as Bluetooth (registered trademark), for example.

The present earphone 1 is what is called a complete wireless earphone in which the left sound emitting unit 10 and the right sound emitting unit 20 are completely independent without being connected by a cable and the like.

Note that, in the wireless earphone according to the present invention, the left and right sound emitting units may be physically connected by a cable or the like.

In the following description, the front side of the present earphone 1 is a direction toward the head of the user in the state in which the present earphone 1 is worn on the head of the user (hereinafter, referred to as the "wearing state"). The rear side of the present earphone 1 is a direction opposite to the direction toward the head of the user in the wearing state.

The left sound emitting unit 10 is worn on the left ear of the user, and outputs the sound wave corresponding to the sound signal from the sound source 100. The left sound emitting unit 10 includes a left casing 11, a left earpiece 12, a left electroacoustic transducer 13, a left circuit board 14, a left earphone rechargeable battery (hereinafter, referred to as a "left rechargeable battery") 15, a left hook 16, left magnets 17, and a left acoustic resistor 18 (see FIG. 1).

The left casing 11 houses the left electroacoustic transducer 13, the left circuit board 14, and the left rechargeable battery 15. The left casing 11 is made of synthetic resin such as plastic, for example. The left casing 11 includes a sound conduit 111, a first communication hole 11h (see FIG. 1), and a second communication hole (not illustrated). The left casing 11 holds the left acoustic resistor 18.

The sound conduit 111 guides the sound wave from the left electroacoustic transducer 13 to the external auditory meatus of the user when the present earphone 1 is in use. The sound conduit 111 has a substantially cylindrical shape. The sound conduit 111 is provided therein with a space (hereinafter, referred to as an "internal space") in which the sound wave from the left electroacoustic transducer 13 are guided. The sound conduit 111 is disposed in front of the left casing 11. Specifically, the sound conduit 111 protrudes in front of the left casing 11. The internal space of the sound conduit 111 communicates with an internal space of the left casing 11.

Note that the sound conduit may be configured separately from the left housing as long as the internal space of the sound conduit communicates with the internal space of the left casing 11.

The first communication hole 11h and the second communication hole communicate a space inside the left casing 11 with the space outside the left casing 11 (hereinafter, referred to as an "external space"). The first communication hole 11h allows the sound wave output from the left electroacoustic transducer 13 to pass.

The second communication hole suppresses an increase in pressure in the internal space of the left casing 11, which is generated when the left sound emitting unit 10 is worn on the left ear of the user (when worn on the auricle of the user), and prevents damage to the left electroacoustic transducer 13 (e.g., damage to a diaphragm (not illustrated) included in the left electroacoustic transducer 13). The second communication hole is disposed in front of the left casing 11.

The left earpiece 12 is in close contact with an inner wall of the ear canal of the user in the worn state. The left earpiece 12 is attached to an outer peripheral surface of the sound conduit 111. The left earpiece 12 is made of an elastic material such as silicone rubber, for example. The left earpiece 12 has a substantially double cylindrical shape in which a front end side is folded back in a U shape in the cross-sectional view.

The left electroacoustic transducer 13 outputs the sound wave corresponding to the sound signal from the sound source 100. The left electroacoustic transducer 13 is, for example, a dynamic electroacoustic transducer. The left electroacoustic transducer 13 is disposed in the internal space of the left casing 11 (housed in the left casing 11).

The left circuit board 14 is a board to which the below-described electronic circuits and terminals within the earphone are attached (mounted). The left circuit board 14 is disposed in the internal space of the left casing 11 (housed in the left casing 11). The left circuit board 14 is, for example, a printed circuit board (PCB). The left circuit board 14 is connected to the left electroacoustic transducer 13 via a signal line (not illustrated).

On the left circuit board 14, a receiving circuit 141, a signal processing circuit 142, a transmission circuit 143, a power receiving terminal 14a, a transmission terminal 14b, and a connection terminal 14c are mounted. The receiving circuit 141, the signal processing circuit 142, and the transmission circuit 143 are examples of the electronic circuit within the earphone described above. That is, the left sound emitting unit 10 includes the receiving circuit 141, the signal processing circuit 142, the transmission circuit 143, the power receiving terminal 14a, the transmission terminal 14b, and the connection terminal 14c. The power receiving terminal 14a, the transmission terminal 14b, and the connection terminal 14c constitute a terminal group 14G.

The receiving circuit 141 receives the sound signal from the sound source 100 via a wireless communication line. The sound signal received by the receiving circuit 141 is a digital signal. The receiving circuit 141 transmits the received sound signal to the signal processing circuit 142 and the transmission circuit 143.

The signal processing circuit 142 processes the sound signal received by the receiving circuit 141, and transmits the processed signal to the left electroacoustic transducer 13. The signal processing circuit 142 is, for example, a D/A conversion circuit. That is, the signal processed by the signal processing circuit 142 (hereinafter, referred to as a "processed signal") is, for example, an analog signal digital signal obtained by D/A converting the digital signal.

The transmission circuit 143 transmits the sound signal from the receiving circuit 141 to the below-described receiving circuit 241 of the right sound emitting unit 20.

The power receiving terminal 14a is connected to the below-described power supply terminal 32aL (see FIG. 4) to receive power to be charged in the left rechargeable battery 15 from the present charger 3 (see FIG. 1). The power receiving terminal 14a is mounted on the left circuit board 14. Apart of the power receiving terminal 14a in contact with the power supply terminal 32aL is exposed to the outside of the left casing 11. The power receiving terminal 14a is constituted by a pair of positive and negative terminals.

The transmission terminal 14b is connected to the below-described receiving terminal 32bL (see FIG. 4) to transmit a signal indicating a remaining power of the left rechargeable battery 15 to the receiving terminal 32bL. The transmission terminal 14b is disposed adjacent to the power receiving terminal (the pair of power receiving terminals) 14a. Apart of the transmission terminal 14b in contact with the receiving terminal 32bL is exposed to the outside of the left casing 11. The signal indicating the remaining power of the left rechargeable battery 15 will be described below.

The connection terminal 14c is connected to the below-described detection terminal 32cL (see FIG. 4). The connection terminal 14c is disposed adjacent to the transmission terminal 14b. Apart of the connection terminal 14c in contact with the detection terminal 32cL is exposed to the outside of the left casing 11.

The four terminals constituting the terminal group 14G (the power receiving terminal (the pair of power receiving terminals) 14a, the transmission terminal 14b, and the connection terminal 14c) are arranged in a row on the outer peripheral surface of the left casing 11, as shown in FIG. 2.

Note that the arrangement of the terminal group is not limited to the present embodiment. That is, for example, the power receiving terminal (a pair of power receiving terminals), the transmission terminal, and the connection terminal may be arranged in two rows.

The left rechargeable battery 15 stores (charges) power from the power receiving terminal 14a and supplies (feeds) power for driving the electronic circuits within the earphone (such as the receiving circuit 141) mounted on the left circuit board 14 to the electronic circuit within the earphone. That is, the left rechargeable battery 15 charges the power to be supplied to the electronic circuit within the earphone from the power receiving terminal 14a and supplies the power for driving the electronic circuit within the earphone to the electronic circuit within the earphone. That is, the power charged in the left rechargeable battery 15 is the power to be supplied to the electronic circuit within the earphone. The left rechargeable battery 15 is an example of the earphone rechargeable battery in the present invention. The left rechargeable battery 15 is, for example, a button-type small rechargeable battery. The left rechargeable battery 15 supplies (feeds) power to the receiving circuit 141, the signal processing circuit 142 and the transmission circuit 143 via the left circuit board 14.

The left rechargeable battery 15 is disposed in the internal space of the left casing 11 (housed in the left casing 11).

The left hook 16 is disposed on the cymba conchae of the user in the wearing state, and fixes the left casing 11 and the left earpiece 12 to the left ear of the user. The left hook 16 is disposed on the outer peripheral surface of the left casing 11. The left hook 16 is configured separately from the left casing 11.

Note that the left hook may be integrally formed with the left casing.

The left magnets 17 set (position) the position of the left sound emitting unit 10 with respect to the present charger 3 when the left sound emitting unit 10 is housed in the present charger 3. The left magnets 17 are constituted by a pair of magnets. The pair of magnets constituting the left magnets 17 are arranged in a row with the terminal group 14G therebetween. A part of the left magnets 17 is exposed to the outside of the left casing 11.

Note that the configuration of the left magnets is not limited to the present embodiment. That is, for example, the number of the left magnet may be one or three or more. The arrangement of the left magnets are not limited to a position between which the terminal group is disposed.

Referring now back to FIG. 1, the left acoustic resistor 18 adjusts frequency characteristics of the left sound emitting unit 10. The left acoustic resistor 18 covers the first communication hole 11h from the inside of the left casing 11. The left acoustic resistor 18 is made of mesh, nonwoven fabric, sponge, felt, or the like.

Referring now back to FIGS. 2 and 3, the right sound emitting unit 20 is worn on the right ear of the user, and outputs the sound wave corresponding to the sound signal from the sound source 100. The configuration of the right sound emitting unit 20 is common to the configuration of the left sound emitting unit 10, except that the right sound emitting unit 20 does not include a transmission circuit. That is, the right sound emitting unit 20 includes a right casing 21, a right earpiece 22, a right electroacoustic transducer 23, a right circuit board 24, a right earphone rechargeable battery (hereinafter, referred to as a "right rechargeable battery") 25, a right hook 26, right magnets 27, and a right acoustic resistor 28 (see FIG. 1). On the right circuit board 24, the receiving circuit 241, a signal processing circuit 242, a power receiving terminal 24a, a transmission terminal 24b, and a connection terminal 24c are attached (mounted). The power receiving terminal (a pair of power receiving terminals) 24a, the transmission terminal 24b, and the connection terminal 24c constitute a terminal group 24G.

Operation of Wireless Earphone

The operation of the present earphone 1 will now be described with reference to FIG. 3.

The digital signal (sound signal) from the sound source 100 is transmitted to the receiving circuit 141 of the left sound emitting unit 10 via a wireless communication line. The receiving circuit 141 transmits the received digital signal (sound signal) to the signal processing circuit 142 and the transmission circuit 143.

The signal processing circuit 142 converts the digital signal (sound signal) transmitted from the receiving circuit 141 to an analog signal (sound signal), and transmits the analog signal to the left electroacoustic transducer 13. The left electroacoustic transducer 13 outputs a sound wave based on the analog signal input from the signal processing circuit 142.

On the other hand, the transmission circuit 143 transmits the digital signal (sound signal) transmitted from the receiving circuit 141 to the receiving circuit 241 of the right sound emitting unit 20. The receiving circuit 241 transmits the digital signal transmitted from the transmission circuit 143 of the left sound emitting unit 10 to the signal processing circuit 242. The signal processing circuit 242 converts the digital signal transmitted from the receiving circuit 241 to an analog signal (sound signal), and transmits the analog signal to the right electroacoustic transducer 23. The right electroacoustic transducer 23 outputs a sound wave based on the analog signal input from the signal processing circuit 242.

Wireless Earphone Charger

The wireless earphone charger according to the present invention will now be described. The present charger 3 functions as a case that houses the present earphone 1, and also functions as a charger that charges the present earphone 1. That is, the present charger 3 charges the present earphone 1 while housing the present earphone 1. In the following description, "charging the present earphone 1" is to store (charge) power in the left rechargeable battery 15 and the right rechargeable battery 25, and "charging the present charger 3" is to store power in the below-described rechargeable battery 35.

Configuration of Wireless Earphone Charger

Figure 4:
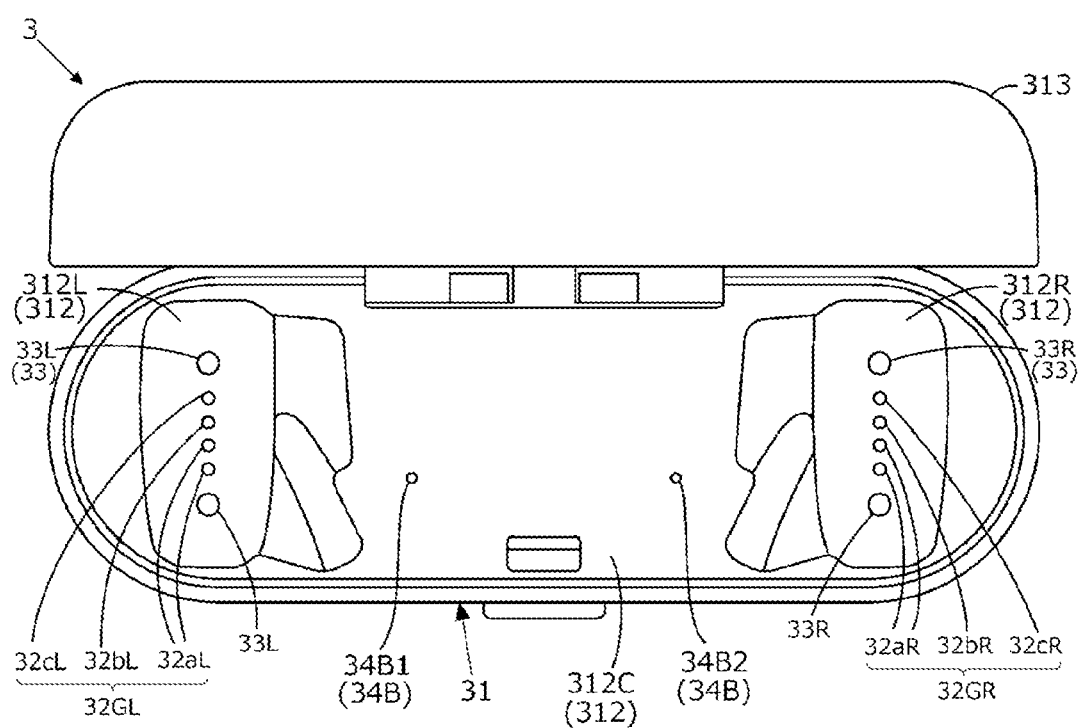
FIG. 4 is a plan view illustrating an exemplary embodiment of a wireless earphone charger according to the present invention.
Figure 5:
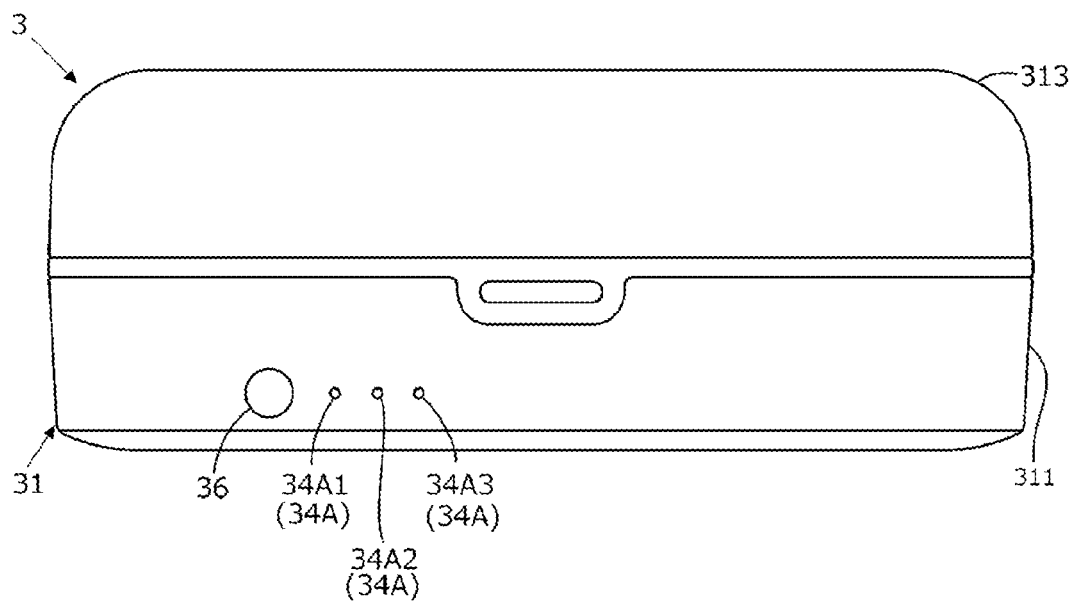
FIG. 5 is a front view of the wireless earphone charger in a state in which a lid of the wireless earphone in FIG. 4 is closed.
Figure 6:
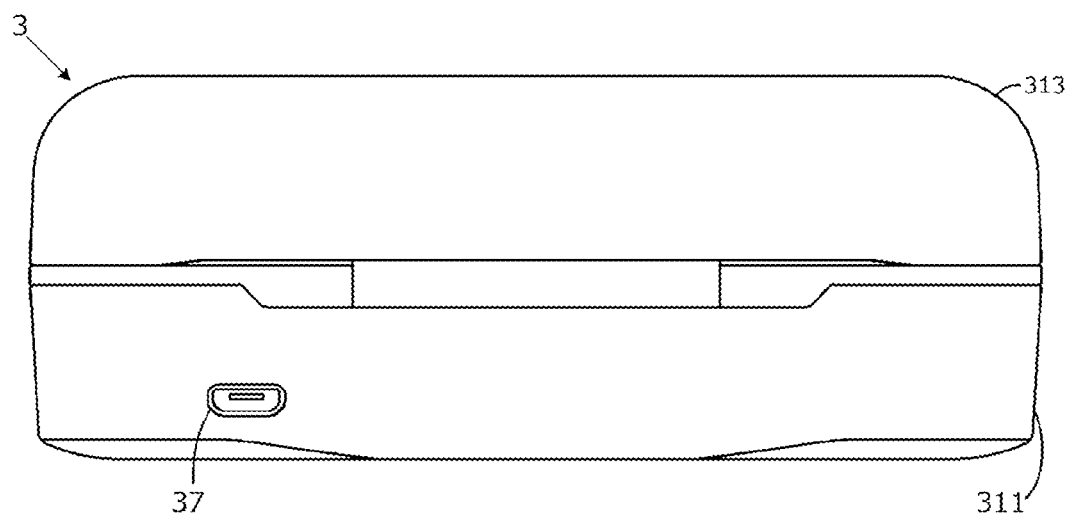
FIG. 6 is a rear view of the wireless earphone charger in FIG. 5.

FIG. 4 is a plan view of the present charger 3.
FIG. 5 is a front view of the present charger 3 in a state in which a lid of the present charger 3 is closed.
FIG. 6 is a rear view of the present charger 3 in FIG. 5.

The present charger 3 houses the present earphone 1 (see FIG. 1) and charges the present earphone 1. When the present earphone 1 is charged, the present earphone 1 is electrically connected to the present charger 3. The present charger 3 includes a case 31, a left terminal group 32GL, a right terminal group 32GR, a circuit board (not illustrated), magnets of the charger (hereinafter, referred to as "magnets") 33, a first indicator 34A, a second indicator 34B, the rechargeable battery 35 (see FIG. 9), a button 36, an external power supply terminal 37, a detector 38 (see FIG. 9), and a controller 39 (see FIG. 9).

The case 31 houses the present earphone 1. The case 31 includes a main body 311, a housing part 312, and a lid 313. The case 31 is made of synthetic resin such as plastic, for example.

The main body 311 houses the left terminal group 32GL, the right terminal group 32GR, the circuit board, the magnets 33, the rechargeable battery 35, the detector 38, and the controller 39. The main body 311 has a bottomed cylindrical shape that is a rounded rectangular in plan view with an opening in an upper part.

The housing part 312 houses the present earphone 1 and covers the opening of the main body 311. That is, the housing part 312 houses the left sound emitting unit 10 (see FIG. 1) and the right sound emitting unit 20 (see FIG. 1). The housing part 312 includes a left housing part 312L, a right housing part 312R, and a housing coupling member 312C.

The left housing part 312L houses the left sound emitting unit 10. The left housing part 312L is constituted by a recess recessed along an outer shape of a rear part of the left sound emitting unit 10.

The right housing part 312R houses the right sound emitting unit 20. The right housing part 312R is constituted by a recess recessed along an outer shape of a rear part of the right sound emitting unit 20.

The housing coupling member 312C couples the left housing part 312L and the right housing part 312R.

The lid 313 prevents the left sound emitting unit 10 and the right sound emitting unit 20 housed in the housing part 312 from falling off from the housing part 312. The lid 313 can be opened and closed with respect to the main body 311 (the case 31). When the lid 313 is closed by the user, the housing part 312 is covered with the lid 313, and the lid 313 is locked with respect to the main body 311.

When the left sound emitting unit 10 is properly housed in the left housing part 312L, the left terminal group 32GL is electrically connected in contact with the terminal group 14G. The left terminal group 32GL is constituted by the power supply terminal 32aL, the receiving terminal 32bL, and the detection terminal 32cL.

The power supply terminal 32aL is connected to the power receiving terminal 14a to supply (feed) the power to the power receiving terminal 14a, which is supplied (fed) from the left rechargeable battery 15 to the receiving circuit 141 (see FIG. 3). The power supply terminal 32aL is constituted by a pair of positive and negative terminals. When supplying power to the power receiving terminal 14a, the pair of terminals of the power supply terminal 32aL is electrically connected in contact with the pair of terminals of the power receiving terminal 14a. The part of the power supply terminal 32aL in contact with the power receiving terminal 14a is exposed from the bottom of the left housing part 312L.

The receiving terminal 32bL is connected to the transmission terminal 14b to receive a signal indicating the remaining power of the left rechargeable battery 15 (hereinafter, referred to as "signal of left earphone's remaining power") from the transmission terminal 14b. When the receiving terminal 32bL is electrically connected in contact with the transmission terminal 14b, the receiving terminal 32bL receives the signal of left earphone's remaining power from the transmission terminal 14b. The receiving terminal 32bL is disposed adjacent to the power supply terminal 32aL. A part of the receiving terminal 32bL in contact with the transmission terminal 14b is exposed from the bottom of the left housing part 312L.

The detection terminal 32cL is connected to the connection terminal 14c to detect that the left sound emitting unit 10 is housed in the left housing part 312L (the present charger 3). When the detection terminal 32cL is electrically connected in contact with the connection terminal 14c, the power receiving terminal 14a and the power supply terminal 32aL are connected. That is, the detection terminal 32cL detects the connection between the power receiving terminal 14a and the power supply terminal 32aL. The detection terminal 32cL is disposed adjacent to the receiving terminal 32bL. A part of the detection terminal 32cL in contact with the connection terminal 14c is exposed from the bottom of the left housing part 312L.

When the right sound emitting unit 20 is properly housed in the right housing part 312R, the right terminal group 32GR is electrically connected in contact with the terminal group 24G. The right terminal group 32GR is constituted by a power supply terminal 32aR, a receiving terminal 32bR, and a detection terminal 32cR.

The power supply terminal 32aR is connected to the power receiving terminal 24a to supply (feed) the power to the receiving terminal 24a, which is supplied (fed) from the right rechargeable battery 25 to the receiving circuit 241 (see FIG. 3). The power supply terminal 32aR is constituted by a pair of positive and negative terminals. When supplying power to the power receiving terminal 24a, the pair of terminals of the power supply terminal 32aR is electrically connected in contact with the pair of terminals of the power receiving terminal 24a. A part of the power supply terminal 32aR in contact with the power receiving terminal 24a is exposed from the bottom of the right housing part 312R.

The receiving terminal 32bR is connected to the transmission terminal 24b to receive a signal indicating the remaining power of the right rechargeable battery 25 (hereinafter, referred to as a "signal of the right earphone's remaining power") from the transmission terminal 24b. When the receiving terminal 32bR is electrically connected in contact with the transmission terminal 24b, the receiving terminal 32bR receives the signal of the right earphone's remaining power from the transmission terminal 24b. The receiving terminal 32bR is disposed adjacent to the power supply terminal 32aR. A part of the receiving terminal 32bR in contact with the transmission terminal 24b is exposed from the bottom of the right housing part 312R.

The detection terminal 32cR is connected to the connection terminal 24c to detect that the right sound emitting unit 20 is housed in the right housing part 312R (the present charger 3). When the detection terminal 32cR is electrically connected in contact with the connection terminal 24c, the power receiving terminal 24a and the power supply terminal 32aR are connected. That is, the detection terminal 32cR detects the connection between the power receiving terminal 24a and the power supply terminal 32aR. The detection terminal 32cR is disposed adjacent to the receiving terminal 32bR. A part of the detection terminal 32cR in contact with the connection terminal 24c is exposed from the bottom of the right housing part 312R.

Note that the arrangement of the terminal group of the present charger is not limited to the present embodiment as long as the arrangement of the terminal group of the present charger corresponds to the arrangement of the terminal group of the present earphone.

The circuit board (not illustrated) is a board on which an electronic circuit and element such as the power supply terminals 32aL and 32aR, the receiving terminals 32bL and 32bR, the detection terminals 32cL and 32cR, the below-described first light emitters 34A11, 34A21 and 34A31, the below-described second light emitters 34B11 and 34B21, the detector 38, and the controller 39 are attached (mounted). The circuit board is, for example, a PCB. The circuit board is constituted by one substrate on which electronic circuits and elements are attached (mounted).

Note that the configuration of the circuit board according to the present invention is not limited to the present embodiment. That is, for example, the circuit board in the present invention may be constituted by a plurality of substrates, and the electronic circuits may be attached to (mounted on) the plurality of circuit boards in a distributed manner.

When the present earphone 1 (the left sound emitting unit 10 and the right sound emitting unit 20) is housed in the present charger 3, the magnets 33 set (positions) the position of the present earphone 1 with respect to the present charger 3. The magnets 33 include magnets on the left charger side (hereinafter, referred to as "left magnets") 33L and magnets on the right charger side (hereinafter, referred to as "right magnets") 33R.

The left magnets 33L set (position) a position of the left sound emitting unit 10 with respect to the present charger 3 when the left sound emitting unit 10 is housed in the present charger 3 (the left housing part 312L). The left magnets 33L are constituted by a pair of magnets. The pair of magnets constituting the left magnets 33L are arranged in a row with the left terminal group 32GL therebetween. A part of the left magnets 33L is exposed from the bottom of the left housing part 312L.

The right magnets 33R set (position) the position of the right sound emitting unit 20 with respect to the present charger 3 when the right sound emitting unit 20 is housed in the present charger 3 (the right housing part 312R). The right magnets 33R are constituted by a pair of magnets. The pair of magnets constituting the right magnets 33R are arranged in a row with the right terminal group 32GR therebetween. A part of the right magnets 33R is exposed from the bottom of the right housing part 312R.

The first indicator 34A indicates the remaining power of the rechargeable battery 35 and the remaining power of the earphone rechargeable battery (the left rechargeable battery 15 and the right rechargeable battery 25) in a plurality of indication modes. The indication modes of the first indicator 34A include a "first indication mode" and a "second indication mode". The first indication mode is an indication mode for indicating the remaining power of the rechargeable battery 35. The second indication mode is an indication mode for indicating the remaining power of the earphone rechargeable battery (the left rechargeable battery 15, the right rechargeable battery 25). The first indicator 34A indicates only one of the first indication mode and the second indication mode. Further, as described below, the first indication mode is different from the second indication mode.

The first indication mode includes a "first individual indication mode" and a "second individual indication mode". That is, the first indication mode includes a plurality of individual indication mode. The first individual indication mode is an indication mode for indicating the remaining power of the rechargeable battery 35 when the present charger 3 is not receiving power from the external power source 200 (see FIG. 10). The second individual indication mode is an indication mode for indicating the remaining power of the rechargeable battery 35 when the present charger 3 is receiving power from the external power source 200. That is, the indication mode for indicating the remaining power of the rechargeable battery 35 varies depending on whether the present charger 3 is receiving power from the external power source 200. As described below, the first individual indication mode is different from the second individual indication mode.

On the other hand, the indication mode (the second indication mode) for indicating the remaining power of the earphone rechargeable battery (the left rechargeable battery 15 and the right rechargeable battery 25) has the same indication mode when the present charger 3 is receiving power from the external power source 200 as the indication mode when the present charger 3 is not receiving power from the external power source 200.

The first indicator 34A is an example of the indicator in the present invention. The first indicator 34A is constituted by three indicators 34A1, 34A2, and 34A3, and three first light emitters 34A11, 34A21, and 34A31 (see FIG. 9) corresponding to the respective indicators 34A1, 34A2, and 34A3.

Note that the number of indicators and the number of first light emitters included in the first indicator are not limited to "3".

Each of the indicators 34A1, 34A2, and 34A3 allows the user to visually recognize light emission modes of the corresponding first light emitters 34A11, 34A21, and 34A31. Apart of each indicator 34A1, 34A2, and 34A3 is disposed in the case 31 as to be exposed to the outside of the main body 311 (the case 31). That is, the first indicator 34A is exposed to the outside of the main body 311 (the case 31). In other words, even if the lid 313 is closed with respect to the main body 311, the user of the present system S can identify the remaining power of the rechargeable battery 35, the remaining power of the earphone rechargeable battery (the left rechargeable battery 15 and the right rechargeable battery 25), and whether the present charger 3 is receiving power from the external power source 200.

The first light emitters 34A11, 34A21, and 34A31 are, for example, multi-color light emitting diodes (LEDs). The first light emitters 34A11, 34A21, and 34A31 are housed in the main body 311 (the case 31).

The light emission modes of each of the first light emitters 34A11, 34A21, and 34A31 are identified based on a "light emission pattern" and a "light emission color". The "light emission pattern" is one of "turned-on", "flashing" and "turned-off". The "light emission color" is either "blue" or "white". That is, the light emission mode of each of the first light emitters 34A11, 34A21, and 34A31 is identified based on a combination of three types of "light emission patterns" and two types of "light emission colors".

The light emission modes of each of the first light emitters 34A11, 34A21, and 34A31 differ according to the remaining power of the rechargeable battery 35, the remaining power of the earphone rechargeable battery (the left rechargeable battery 15, the right rechargeable battery 25), and whether the present charger 3 is receiving power from the external power source 200.

The first light emitters 34A11, 34A21, and 34A31 emit blue light when indicating the remaining power of the rechargeable battery 35. The first light emitters 34A11, 34A21, and 34A31 emit white light when indicating the remaining power of the earphone rechargeable battery (the left rechargeable battery 15 and the right rechargeable battery 25). The light emitting colors of the first light emitters 34A11, 34A21, and 34A31 are different between a case where the light emitting color indicates the remaining power of the rechargeable battery 35 and a case where the light emitting color indicates the remaining power of the earphone rechargeable battery.

As described below, the light emission patterns of each of the first light emitters 34A11, 34A21, and 34A31 differ according to the remaining power of the rechargeable battery 35 or the earphone rechargeable battery (the left rechargeable battery 15, and the right rechargeable battery 25).

The first indicator 34A indicates the light emission modes of each of the first light emitters 34A11, 34A21, and 34A31 using the indicators 34A1, 34A2, and 34A3. That is, the user of the present system S can identify the remaining power of the rechargeable battery 35, the remaining power of the earphone rechargeable battery (the left rechargeable battery 15 and the right rechargeable battery 25), and whether the present charger 3 is receiving power from the external power source 200 through visually recognizing the light emission modes of each of the first light emitters 34A11, 34A21, and 34A31 indicated on the first indicator 34A.

The second indicator 34B indicates a connection state between the detection terminal 32cL and 32cR and the connection terminal 14c and 24c, i.e., whether the detection terminal 32cL and the connection terminal 14c are electrically connected, and whether the detection terminal 32cR and the connection terminal 24c are electrically connected. Further, the second indicator 34B indicates the remaining power of the earphone rechargeable battery (the left rechargeable battery 15 and the right rechargeable battery 25). The remaining power of the earphone rechargeable battery indicated on the second indicator 34B is either charging or charging completion (fully charged). A part of the second indicator 34B is disposed so as to be exposed to the outside of the housing coupling member 312C (the housing part 312). The second indicator 34B includes two indicators 34B1 and 34B2, and two second light emitters 34B11 and 34B21 (see FIG. 9) corresponding to the respective indicators 34B1 and 34B2.

Each of the indicators 34B1 and 34B2 allows the user to visually recognize light emission modes of the corresponding second light emitter 34B11 or 34B21. Apart of each of the indicators 34B1 and 34B2 is disposed in the housing coupling member 312C (the housing part 312) so as to be exposed from the housing coupling member 312C. When the lid 313 is closed with respect to the main body 311, the second indicator 34B is covered with the lid 313. That is, when the lid 313 is closed with respect to the main body 311, the user of the present system S cannot identify a connection state between the detection terminals 32cL and 32cR and the connection terminals 14c and 24c, and the remaining power of the earphone rechargeable battery. On the other hand, when the lid 313 is opened with respect to the main body 311, the second indicator 34B is visibly recognizable from the outside of the main body 311. That is, only when the lid 313 is open with respect to the main body 311, the user of the present system S can identify the connection state between the detection terminals 32cL and 32cR and the connection terminals 14c and 24c, and the remaining power of the earphone rechargeable battery based on the light emission modes of the second indicator 34B.

The second light emitters 34B11 and 34B21 are monochromatic (white) LED. The second light emitters 34B11 and 34B21 are housed in the main body 311 (the case 31).

The light emission modes of each of the second light emitters 34B11 and 34B21 are identified based on the "light emission pattern". The "light emission pattern" is one of "turned-on", "flashing" and "turned-off".

The light emission modes of each of the second light emitters 34B11 and 34B21, i.e., the light emission patterns of each of the second light emitters 34B11 and 34B21 are different depending on the connection state between the detection terminals 32cL and 32cR and the connection terminals 14c and 24c, and the remaining power of the earphone rechargeable battery.

The light emission pattern of each of the second light emitters 34B11 and 34B21 is "turned-off" when the detection terminal 32cL and 32cR are not connected to the connection terminal 14c and 24c, respectively.

The light emission patterns of each of the second light emitters 34B11 and 34B21 is "flashing" when the detection terminals 32cL and 32cR are connected to the connection terminals 14c and 24c, respectively, and the earphone rechargeable battery is being charged.

The light emission patterns of each of the second light emitters 34B11 and 34B21 is "flashing" when the detection terminals 32cL and 32cR are connected to the connection terminals 14c and 24c, respectively, and the earphone rechargeable battery is fully charged.

Note that the light emission pattern of each of the second light emitters 34B11 and 34B21 for a case where the present charger 3 is receiving power from the external power source 200, and the detection terminals 32cL and 32cR are connected to the connection terminals 14c and 24c, respectively, is "flashing" when the earphone rechargeable battery is being charged, then changes to "turned-on" when the earphone rechargeable battery is fully charged. Thereafter, the light emission pattern of each of the second light emitters 34B11 and 34B21 remains "turned-on".

On the other hand, the light emission pattern of each of the second light emitters 34B11 and 34B21 for a case where the present charger 3 is not receiving power from the external power source 200 and the detection terminals 32cL and 32cR are connected to the connection terminals 14c and 24c, respectively, is "flashing" when the earphone rechargeable battery is being charged, then changed to "turned-on" when the earphone rechargeable battery is fully charged. Then, after a predetermined time has lapsed, the light emission pattern of each of the second light emitters 34B11 and 34B21 changes from "turned-on" to "turned-off".

Thus, in a case that the earphone rechargeable battery is being charged or fully charged (before a predetermined time has lapsed since the charging is completed), the light emission pattern of each of the second light emitters 34B11 and 34B21 when the detection terminals 32cL and 32cR are connected to the connection terminals 14c and 24c, respectively while the present charger 3 is receiving power from the external power source 200 is the same as the light emission pattern when the detection terminals 32cL and 32cR are connected to the connection terminals 14c and 24c while the present charger 3 is not receiving power from the external power source 200. On the other hand, after the earphone rechargeable battery is fully charged (after a predetermined time has lapsed since the charging is completed), the light emission pattern of each of the second light emitters 34B11 and 34B21 when the detection terminal 32cL and 32cR are connected to the connection terminal 14c and 24c, respectively while the present charger 3 is receiving power supply from the external power source 200 is different from the light emission pattern when the detection terminal 32cL and 32cR are connected to the connection terminal 14c and 24c, respectively while the present charger 3 is not receiving power supply from the external power source 200.

The second indicator 34B indicates the light emission modes of each of the second light emitters 34B11 and 34B21 using the indicators 34B1 and 34B2. The indication modes of the second indicator 34B are identified based on "indication patterns". The indication patterns of the second indicator 34B are the light emission patterns of each of the second light emitters 34B11 and 34B21. That is, after the earphone rechargeable battery is fully charged (after a predetermined time has lapsed since the charging is completed), the light emission pattern of the second indicator 34B when the detection terminal 32cL and 32cR are connected to the connection terminal 14c and 24c, respectively while the present charger 3 is receiving power supply from the external power source 200 is different from the light emission pattern when the detection terminal 32cL and 32cR are connected to the connection terminal 14c and 24c, respectively while the present charger 3 is not receiving power supply from the external power source 200.

Thus, the user of the present system S can identify the connection state between the detection terminals 32cL and 32cR and the connection terminals 14c and 24c, and the remaining power of the earphone rechargeable battery by visually recognizing the light emission patterns of each of the second light emitters 34B11 and 34B21 indicated on the second indicator 34B, i.e., the indication modes of the second indicator 34B.

The rechargeable battery 35 (see FIG. 9) charges power to be supplied to the earphone rechargeable battery (the left rechargeable battery 15 and the right rechargeable battery 25) and the electronic circuit provided in the present charger 3. The power to be charged in the rechargeable battery 35 is, for example, power from an external power source 200 (see FIG. 10).

The rechargeable battery 35 supplies (feeds) power to be supplied from the earphone rechargeable battery (the left rechargeable battery 15 and the right rechargeable battery 25) to the receiving circuits 141 and 241. The rechargeable battery 35 is housed in the main body 311 (the case 31). The rechargeable battery 35 is electrically connected to the power supply terminals 32aL and 32aR via a wiring (not illustrated) in the main body 311 (the case 31).

The button 36 is operated by the user of the present charger 3. The button 36 is a push button. The operation to the button 36 is a push operation. A part of the button 36 is disposed so as to be exposed to the outside of the main body 311 (the case 31). The indication mode of the first indicator 34A are switched based on the push operation to the button 36 by the user. Specifically, the indication modes of the first indicator 34A are alternately switched between the first indication mode and the second indication mode based on the push operation to the operation section 36 by the user. In other words, the button 36 is operated to switch the indication modes of the first indicator 34A. As described above, the "first indication mode" is an indication mode for indicating the remaining power of the rechargeable battery 35, and the "second indication mode" is an indication mode for indicating the remaining power of the earphone rechargeable battery (the left rechargeable battery 15 and the right rechargeable battery 25).

The external power supply terminal 37 is a terminal to which the power supply cable C for supplying (feeding) power to be charged to the rechargeable battery 35 (see FIG. 10) is connected. The external power supply terminal 37 supplies (feeds) power from the external power source 200 to the rechargeable battery 35 via the power supply cable C. The external power supply terminal 37 is an example of a cable connection terminal in the present embodiment, for example, a USB (Universal Serial Bus) terminal. The power supply cable C is, for example, a USB cable. The external power supply 200 is, for example, a rechargeable battery built in the personal computer and a commercial power supply. The external power supply terminal 37 transmits a connection signal, which indicates that the power supply cable C is connected, to the controller 39 via the detector 38.

The detector 38 (see FIG. 9) detects whether the power supply cable C is connected to the external power supply terminal 37. The detector 38 is housed in the main body 311, i.e., the case 31. The detector 38 transmits a detection result corresponding to the connection of the power supply cable C to the external power supply terminal 37 (e.g., a signal indicating that the power supply cable C is connected to the external power supply terminal 37) to the controller 39.

The controller 39 (see FIG. 9) switches the indication modes of the first indicator 34A based on the operation to the button 36, the detection result of the detector 38, the above-described signal of left earphone's remaining power, the signal of right earphone's remaining power, and the below-described signal of charger's remaining power. The control part 39 is housed in the main body section 311, i.e., the case 31.

Indication Mode of Indicator

The indication modes of the first indicator 34A will now be described by taking a case where the present earphone 1 is housed in the present charger 3 as an example.

FIG. 7 is a schematic diagram illustrating a combination of the remaining power of the rechargeable battery 35 or the earphone rechargeable battery (the left rechargeable battery 15 and the right rechargeable battery 25) and the indication modes of the first indicator 34A when the power supply cable C is not connected to the present charger 3 (the external power supply terminal 37).

In FIG. 7, a filled circle indicates a state in which the first light emitters 34A11, 34A21, and 34A31 are turned on in blue, a dashed circle indicates a state in which the first light emitters 34A11, 34A21, and 34A31 are turned off, and a hollow circle indicates a state in which the first light emitters 34A11, 34A21, and 34A31 are turned on in white. Further, FIG. 7 illustrates that the indication color (blue) of the first indicator 34A when indicating the remaining power of the rechargeable battery 35 is different from the indication color (white) of the first indicator 34A when indicating the remaining power of the earphone rechargeable battery.

The indication modes of the first indicator 34A are identified based on a combination of the "indication patterns" and the "indication colors". The indication mode of the first indicator 34A when the power supply cable C is not connected to the present charger 3 is the first individual indication mode.

The indication patterns of the first indicator 34A are a combination of the light emission patterns of the first light emitters 34A11, 34A21, and 34A31. The indication colors of the first indicator 34A are the light emission colors of the first light emitters 34A11, 34A21, and 34A31.

The FIG. 7 illustrates that the indication patterns of the first indicator 34A differ according to the remaining power of the rechargeable battery 35 or the earphone rechargeable battery: "0% to less than 30%", "30% to less than 60%", "60% to less than 100%", and "100% (fully charged)". For example, when the remaining power of the rechargeable battery 35 is "0% to less than 30%", the indication pattern of the first indicator 34A indicates that the light emission patterns of the first light emitters 34A11, 34A21, and 34A31 are "turned-on (in blue)", "turned-off", and "turned-off", respectively. When the remaining power of the rechargeable battery 35 is "30% to less than 60%", the indication pattern of the first indicator 34A indicates that the light emission patterns of the first light emitters 34A11, 34A21, and 34A31 are "turned-on (in blue)", "turned-on (in blue)", and "turned-off", respectively. When the remaining power of the rechargeable battery 35 is "60% to less than 100%", the indication pattern of the first indicator 34A indicates that the light emission pattern of each of the first light emitters 34A11, 34A21, and 34A31 is "turned-on (in blue)". Similarly, when the remaining power of the rechargeable battery 35 is "100% (fully charged)", the indication pattern of the first indicator 34A indicates that the light emission pattern of each of the first light emitters 34A11, 34A21, and 34A31 is "turned-on (in blue)".

The indication modes of the first indicator 34A when indicating the remaining power of the earphone rechargeable battery are different from the indication modes of the first indicator 34A when indicating the remaining power of the rechargeable battery 35 in the indication color. That is, for example, when the remaining power of the earphone rechargeable battery is "0% to less than 30%", the indication pattern of the first indicator 34A indicates that the light emission patterns of the first light emitters 34A11, 34A21, and 34A31 are "turned-on (in white)", "turned-off", and "turned-off", respectively. When the remaining power of the earphone rechargeable battery is "30% to less than 60%", the indication pattern of the first indicator 34A indicates that the light emission patterns of the first light emitters 34A11, 34A21, and 34A31 are "turned-on (in white)", "turned-on (in white)", and "turned-off", respectively. When the remaining power of the earphone rechargeable battery is "60% to less than 100%", the indication pattern of the first indicator 34A indicates that the light emission pattern of each of the first light emitters 34A11, 34A21, and 34A31 is "turned-on (in white)". Similarly, when the remaining power of the rechargeable battery 35 is "100% (fully charged)", the indication pattern of the first indicator 34A indicates that the light emission pattern of each of the first light emitters 34A11, 34A21, and 34A31 is "turned-on (in white)".

FIG. 8 is a schematic diagram illustrating a combination of the remaining power of the rechargeable battery 35 or the earphone rechargeable battery (the left rechargeable battery 15 and the right rechargeable battery 25) and the indication modes of the first indicator 34A when the power supply cable C is connected to the present charger 3 (the external power supply terminal 37).

In FIG. 8, a filled circle indicates a state in which the first light emitters 34A11, 34A21, and 34A31 are turned-on in blue, a dashed circle indicates a state in which the first light emitters 34A11, 34A21, and 34A31 are turned-off, a hollow circle indicates a state in which the first light emitters 34A11, 34A21, and 34A31 are turned-on in white, and a double circle indicates a state in which the first light emitters 34A11, 34A21, and 34A31 are flashing in blue. Further, FIG.

8 illustrates that the indication color (blue) of the first indicator 34A when indicating the remaining power of the rechargeable battery 35 is different from the indication color (white) of the first indicator 34A when indicating the remaining power of the earphone rechargeable battery.

As described above, the indication modes of the first indicator 34A are identified based on the combination of the "indication patterns" and the "indication colors". The indication mode of the first indicator 34A when the power supply cable C is connected to the present charger 3 is the second individual indication mode. That is, the individual indication mode (the second individual indication mode) when the power supply cable C is connected to the present charger 3 (the external power supply terminal 37) is different from the individual indication mode (the first individual indication mode) when the power supply cable C is not connected to the present charger 3 (the external power supply terminal 37).

The FIG. 8 illustrates that the indication patterns of the first indicator 34A differ according to the remaining power of the rechargeable battery 35 or the earphone rechargeable battery: "0% to less than 30%", "30% to less than 60%", "60% to less than 100%", and "100% (fully charged)". For example, when the remaining power of the rechargeable battery 35 is "0% to less than 30%", the indication pattern of the first indicator 34A indicates that the light emission patterns of the first light emitter 34A11, 34A21, and 34A31 are "flashing (in blue)", "turned-off", and "turned-off", respectively. When the remaining power of the rechargeable battery 35 is "30% to less than 60%", the indication pattern of the first indicator 34A indicates that the light emission patterns of the first light emitter 34A11, 34A21, and 34A31 are "turned-on (in blue)", "flashing (in blue)", and "turned-off", respectively. When the remaining power of the rechargeable battery 35 is "60% to less than 100%", the indication pattern of the first indicator 34A indicates that the light emission patterns of the first light emitter 34A11, 34A21, and 34A31 are "turned-on (in blue)", "turned-on (in blue)", and "flashing (in blue)", respectively. When the remaining power of the rechargeable battery 35 is "100% (fully charged)", the indication pattern of the first indicator 34A indicates that the light emission pattern of each of the first light emitter 34A11, 34A21, and 34A31 is "turned-on (in blue)".

The indication mode of the first indicator 34A when indicating the remaining power of the earphone rechargeable battery is the same as the indication mode of the first indicator 34A when indicating the remaining power of the earphone rechargeable battery in a state in which the power supply cable C is not connected to the present charger 3 (the external power supply terminal 37) (see FIG. 7). That is, the indication mode of the first indicator 34A when indicating the remaining power of the earphone rechargeable battery in a state in which the power supply cable C is connected to the present charger 3 (the external power supply terminal 37) shown in FIG. 8 is the same as the indication mode of the first indicator 34A when indicating the remaining power of the earphone rechargeable battery in a state in which the power supply cable C is not connected to the present charger 3 (the external power supply terminal 37) shown in FIG. 7.

Note that, in a case where the power supply cable C is connected to the present charger 3 (the external power supply terminal 37), in the indication mode of the first indicator when indicating the remaining power of the earphone rechargeable battery, the light emission mode of one of the first light emitters may be changed to "flashing (in white)" in the similar manner to the indication mode of the first indicator when indicating the remaining power of the rechargeable battery. That is, for example, in the indication pattern of the first indicator, the light emission pattern of the first light emitter 34A11 may be "flashed (in white)" when the remaining power of the earphone rechargeable battery is "0% to less than 30%," the light emission pattern of the first light emitter 34A21 may be "flashed (in white)" when the remaining power of the earphone rechargeable battery is "30% to less than 60%", and the light emission pattern of the first light emitter 34A31 is "flashed (in white)" when the remaining power of the earphone rechargeable battery is "60% to less than 100%."

Thus, the user of the present system S can identify the remaining power of the rechargeable battery 35 or the earphone rechargeable battery by visually recognizing the indication modes of the first indicator 34A. Also, the user of the present system S can identify whether the power supply cable C is connected to the present charger 3 by visually recognizing the indication modes of the first indicator 34A.

Charging Operation of Wireless Earphone System

A charging operation of the present system S will now be described. In the charging operation of the present system S, the charging from the present charger 3 to the right sound emitting unit 20 is common to the charging from the present charger 3 to the left sound emitting unit 10. Therefore, the charging operation of the present system S will be described by taking the charging from the present charger 3 to the left sound emitting unit 10 as an example.

Figure 9:
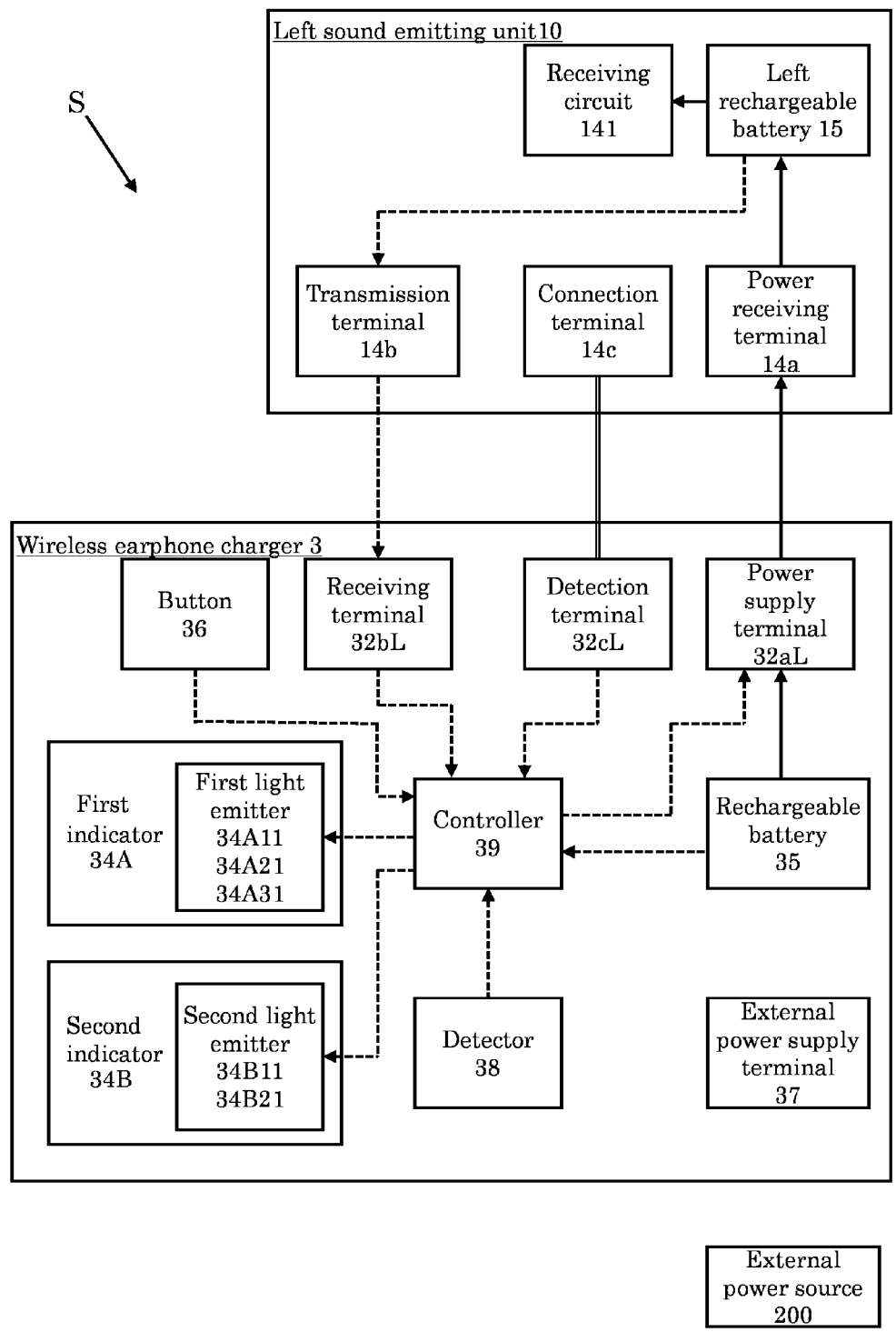
FIG. 9 is a functional block diagram of the wireless earphone system in FIG. 1 when the wireless earphone system is not connected to an external power source.

FIG. 9 is a functional block diagram of the present system S when the present system S is not connected to the external power supply 200.

Figure 10:
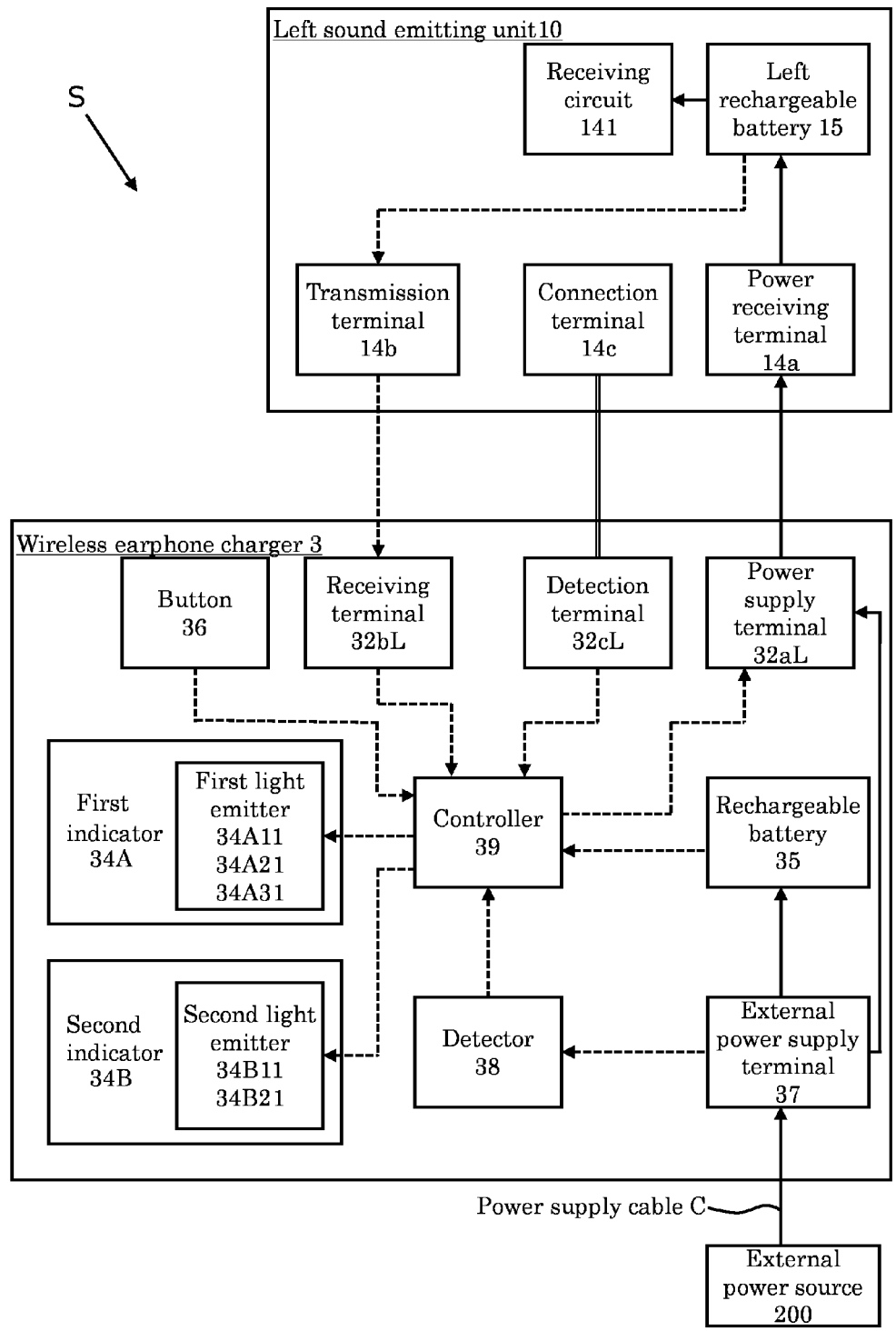
FIG. 10 is a functional block diagram of the wireless earphone system in FIG. 1 when the wireless earphone system is connected to the external power source.

In FIG. 9, a solid line indicates the flow of power, a dashed line indicates the flow of signal, and a double line indicates the electrical connection (the same applies to FIG. 10).

The power flow in the present system S will now be described.

The present charger 3 supplies power to the present earphone 1.

The rechargeable battery 35 stores (charges) the power supplied from the external power source 200 in advance, and supplies (feeds) the stored power to the power supply terminal 32aL.

The power supply terminal 32aL supplies the power supplied (received) from the rechargeable battery 35 to the power receiving terminal 14a. The supply of power from the power supply terminal 32aL to the power receiving terminal 14a starts when the detection terminal 32cL and the connection terminal 14c are connected.

The power receiving terminal 14a receives the supply of power from the rechargeable battery 35 from the power supply terminal 32aL. For example, the present charger 3 includes a switch (not illustrated) (e.g., FET (field effect transistor)) in series between the rechargeable battery 35 and the power supply terminal 32aL. The controller 39 of the present charger 3 turns on the switch when the detection terminal 32cL and the connection terminal 14c are connected to start supplying the power charged in the rechargeable battery 35 from the power supply terminal 32aL to the power receiving terminal 14a. Further, the controller 39 turns off the switch when the connection between the detection terminal 32cL and the connection terminal 14c is released to stop supplying the power from the power supply terminal 32aL to the power receiving terminal 14a. That is, the controller 39 charges the present earphone 1 when the detection terminal 32cL and the connection terminal 14c are connected to each other.

The power receiving terminal 14a supplies power supplied (received) from the power supply terminal 32aL to the left rechargeable battery 15. The left rechargeable battery 15 stores the power supplied from the power receiving terminal 14a, and supplies the power to the electronic circuit included in the left sound emitting unit 10 (such as the receiving circuit 141).

The signal flow in the present system S will now be described.

The detector 38 transmits a signal indicating that the power supply cable C is not connected to the external power supply terminal 37 (non-connection detection signal) to the controller 39.

The rechargeable battery 35 transmits a signal (signal of charger's remaining power) indicating the remaining power of the rechargeable battery 35 to the controller 39.

The left rechargeable battery 15 transmits a signal (signal of left earphone's remaining power) indicating the remaining power of the left rechargeable battery 15 to the receiving terminal 32bL via the transmission terminal 14b. The receiving terminal 32bL receives the signal of left earphone's remaining power from the transmission terminal 14b when (electrically) connected to the transmission terminal 14b, and transmits the signal to the controller 39. That is, the left rechargeable battery 15 transmits the signal of left earphone's remaining power to the controller 39.

The detection terminal 32cL transmits a signal (detection signal) indicating that the detection terminal 32cL is connected to the connection terminal 14c to the controller 39, when (electrically) connected to the connection terminal 14c. The controller 39 also detects that the power receiving terminal 14a and the power supply terminal 32aL are connected by receiving the detection signal.

The button 36 transmits a signal (operation signal) indicating that the button 36 is pushed to the controller 39, when pushed by the user of the present system S.

The controller 39 which has received the non-connection detection signal from the detector 38 transmits a signal indicating each of the light emission modes to each of the first light emitters 34A11, 34A21, and 34A31. The signal indicating each of the light emission modes transmitted by the controller 39 to each of the first light emitters 34A11, 34A21, and 34A31 differs depending on "the signal of charger's remaining power received from the rechargeable battery 35", "the signal of left earphone's remaining power received from the left rechargeable battery 15", and "the operation signal received from the button 36." That is, the controller 39 causes the first indicator 34A to indicate any of the indication patterns of the first individual indication mode or the second indication mode, i.e., any of the indication patterns in FIG. 7.

Further, the controller 39 that has received the signal of left earphone's remaining power from the receiving terminal 32bL transmits the signal received from the left rechargeable battery 15 to each of the first light emitters 34A11, 34A21, and 34A31. The controller 39 then causes the first indicator 34A to indicate the indication patterns of the second indication mode. In other words, the first indicator 34A indicates the remaining power of the left rechargeable battery based on the signal of left earphone's remaining power received by the receiving terminal 32bL.

Furthermore, the controller 39 which has received the detection signal from the detection terminal 32cL transmits a signal indicating each of the light emission modes (light emission patterns) to each of the second light emitters 34B11 and 34B21. The signal indicating each of the light emission patterns transmitted to each of the second light emitters 34B11 and 34B21 by the controller 39 differs according to the remaining power of the left rechargeable battery 15. That is, the controller 39 transmits a signal in which the light emission pattern of each of the second light emitters 34B11 and 34B21 is "turned-on", when the left rechargeable battery 15 is fully charged. On the other hand, the controller 39 transmits a signal in which the light emission pattern of each of the second light emitters 34B11 and 34B21 is "flashing", when the left rechargeable battery 15 is being charged.

FIG. 10 is a functional block diagram of the present system S when the present system S is connected to the external power supply 200 via the power supply cable C.

The power flow in the present system S will now be described.

The present charger 3 stores (charges) power from the external power supply 200. The power from the external power source 200 is supplied (fed) to the rechargeable battery 35 and the power supply terminal 32aL via the power supply cable C and the external power supply terminal 37.

The rechargeable battery 35 stores (charges) the power supplied from the external power source 200.

The power supply terminal 32aL supplies the power supplied from the external power supply 200 via the external power supply terminal 37 to the power receiving terminal 14a. The supply of power from the power supply terminal 32aL to the power receiving terminal 14a starts when the detection terminal 32cL and the connection terminal 14c are connected.

Note that, when the external power supply terminal is connected to the external power supply via the power supply cable, the power supplied from the power supply terminal to the power receiving terminal may be power supplied from the rechargeable battery to the power supply terminal instead of the power supplied from the external power supply terminal to the power supply terminal. Further, when the external power supply terminal is connected to the external power supply via the power supply cable, the power supplied from the power supply terminal to the power receiving terminal may be power supplied to the power supply terminal from the external power supply terminal as well as power supplied to the power supply terminal from the rechargeable battery.

The power receiving terminal 14a receives power from the power supply terminal 32aL, which is supplied from the external power supply 200 via the external power supply terminal 37. The present charger 3 includes, for example, a switch (not illustrated) (e.g., FET (field effect transistor)) in series between the external power supply terminal 37 and the power supply terminal 32aL. The controller 39 of the present charger 3 turns on the switch when the detection terminal 32cL and the connection terminal 14c are connected to start supply of power, which is supplied from the external power source 200, from the power supply terminal 32aL to the power receiving terminal 14a. Further, the controller 39 turns off the switch when the connection between the detection terminal 32cL and the connection terminal 14c is released to stop the supply of power from the power supply terminal 32aL to the power receiving terminal 14a. That is, the controller 39 charges the present earphone 1 when the detection terminal 32cL and the connection terminal 14c are connected to each other.

The power receiving terminal 14a supplies power supplied (received) from the power supply terminal 32aL to the left rechargeable battery 15. The left rechargeable battery 15 stores the power supplied from the power receiving terminal 14a, and supplies the power to the electronic circuit included in the left sound emitting unit 10 (such as the receiving circuit 141).

The signal flow in the present system S will now be described.

The detector 38 transmits a signal (connection detection signal), which indicates that the power supply cable C is connected to the external power supply terminal 37, to the controller 39.

The signal of charger's remaining power received by the controller 39 from the rechargeable battery 35, the signal of left earphone's remaining power received by the controller 39 from the left rechargeable battery 15, the detection signal received by the controller 39 from the detection terminal 32cL, and the operation signal received by the controller 39 from the button 36 are the same as when the present system S is not connected to the external power supply 200 described with reference to FIG. 9. Accordingly, the description of these signals will not be repeated herein.

The controller 39 which has received the connection detection signal from the detector 38 transmits a signal indicating each of the light emission modes to each of the first light emitter 34A11, 34A21, and 34A31. The signal indicating each of the light emission modes transmitted by the controller 39 to each of the first light emitters 34A11, 34A21, and 34A31 differs depending on "the signal of charger's remaining power received from the rechargeable battery 35", "the signal of left earphone's remaining power received from the left rechargeable battery 15", and "the operation signal received from the button 36." That is, the controller 39 causes the first indicator 34A to indicate any of the indication patterns of the second individual indication mode or the second indication mode, i.e., any of the indication patterns in FIG. 8.

Further, the controller 39 that has received the signal of left earphone's remaining power from the receiving terminal 32bL transmits the signal of left earphone's remaining power received from the left rechargeable battery 15 to each of the first light emitters 34A11, 34A21, and 34A31. The controller 39 then causes the first indicator 34A to indicate the indication patterns of the second indication mode. In other words, the first indicator 34A indicates the remaining power of the left rechargeable battery based on the signal of left earphone's remaining power received by the receiving terminal 32bL.

Furthermore, the controller 39 which has received the detection signal from the detection terminal 32cL transmits a signal indicating each of the light emission modes (light emission patterns) to each of the second light emitters 34B11 and 34B21. The signal indicating each of the light emission patterns transmitted to each of the second light emitters 34B11 and 34B21 by the controller 39 differs according to the remaining power of the left rechargeable battery 15. That is, the controller 39 transmits a signal in which the light emission pattern of each of the second light emitters 34B11 and 34B21 is "turned-on", when the left rechargeable battery 15 is fully charged. On the other hand, the controller 39 transmits a signal in which the light emission pattern of each of the second light emitters 34B11 and 34B21 is "flashing", when the left rechargeable battery 15 is being charged.

Figure 11:
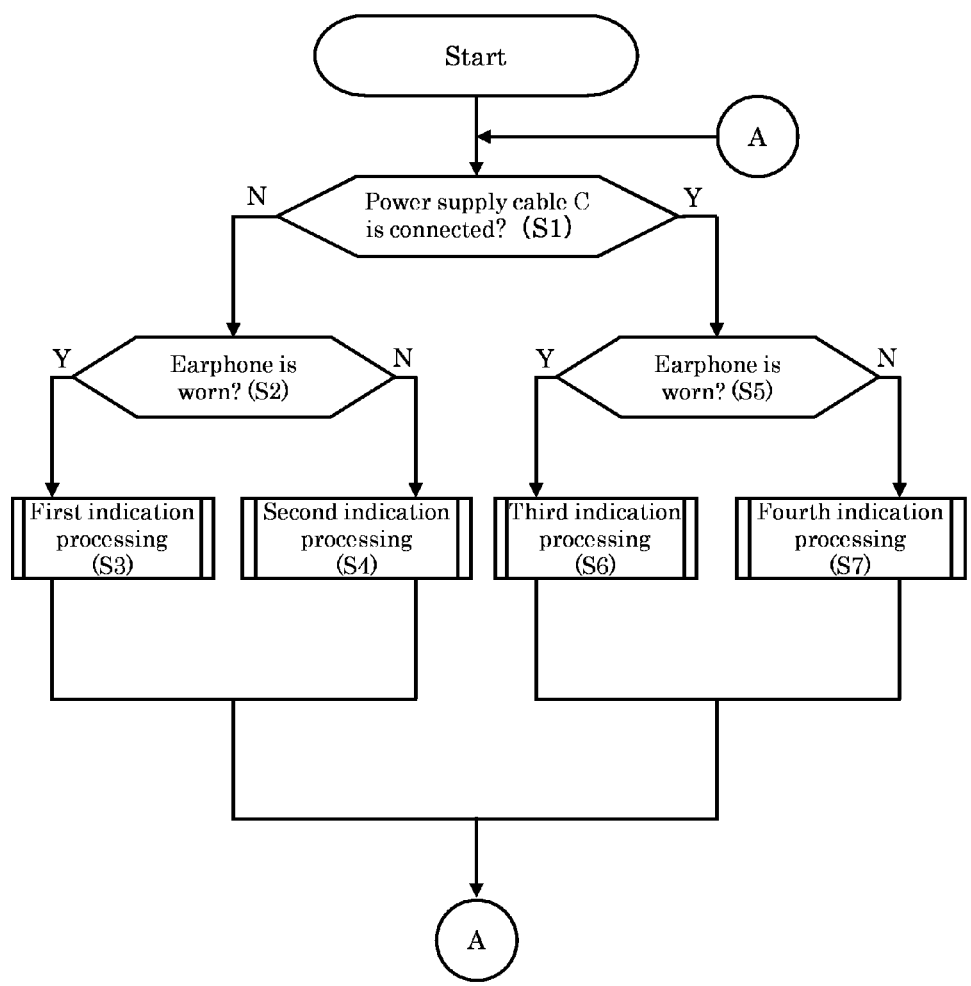
FIG. 11 is a flowchart illustrating a charging indication operation of the wireless earphone system in FIG. 1.

FIG. 11 is a flowchart illustrating a charging indication operation of the present system S.

First, the detector 38 detects whether the power supply cable C is connected to the external power supply terminal 37 (S1).

When the detector 38 does not detect the connection of the power supply cable C to the external power supply terminal 37 ("N" in S1), the controller 39 determines whether the present earphone 1 is connected to the present charger 3, that is, whether the connection terminals 14c and 24c are (electrically) connected to the detection terminals 32cL and 32cR, respectively (S2).

When the present earphone 1 is connected to the present charger 3, that is, when the connection terminals 14c and 24c are (electrically) connected to the detection terminals 32cL and 32cR, respectively ("Y" in S2), the controller 39 executes indication processing (hereinafter, referred to as "first indication processing") for a case where the present earphone 1 is worn in a state in which the power supply cable C is not connected to the external power supply terminal 37.

Figure 12:
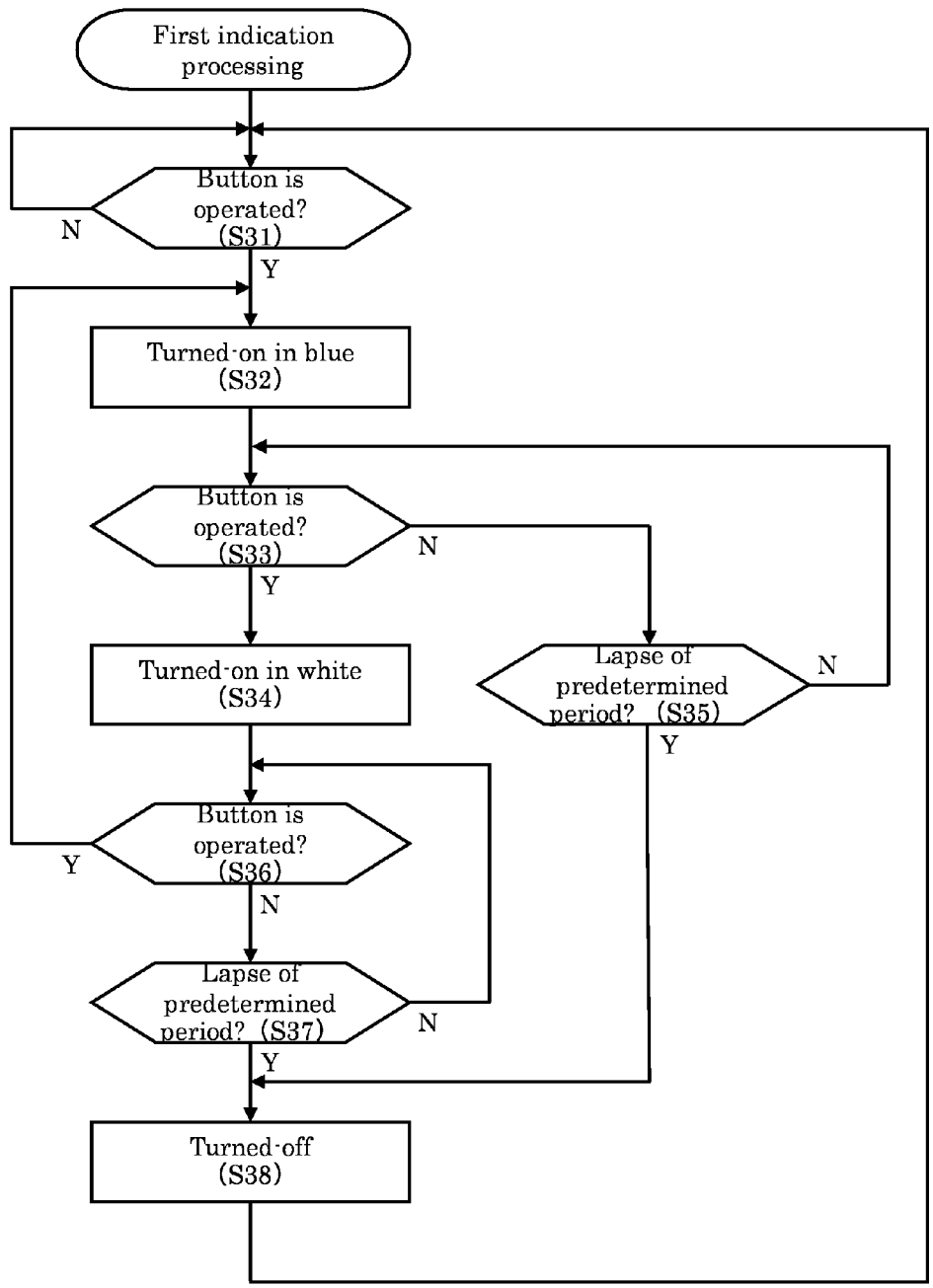
FIG. 12 is a flowchart of a first indication processing included in the flowchart of FIG. 11.

FIG. 12 is a flowchart of the first indication processing.

When the power supply cable C is not connected to the present charger 3 (the external power supply terminal 37), the indication pattern of the first indicator 34A is an indication pattern in which the light emission pattern of each of the first light emitters 34A11, 34A21, and 34A31 corresponding to the indicators 34A1, 34A2, and 34A3 are "turned-off" (hereinafter, referred to as "turned-off pattern") (the same applies to FIG. 13) until any operation (such as, the push operation to the button 36, and the connection of the power supply cable C to the present charger 3) is performed.

First, in step S31, the controller 39 determines whether the button 36 are operated.

When the button 36 is not operated ("N" in S31), the controller 39 waits for the button 36 to be operated.

On the other hand, when the button 36 is operated ("Y" in S31), the controller 39 turns on any or all of the first light emitters 34A11, 34A21, and 34A31 in blue according to the remaining power of the rechargeable battery 35, thereby causing the first indicator 34A to indicate the first indication mode corresponding to the remaining power of the rechargeable battery 35 (S32).

When the first indicator 34A indicates the first indication mode (S32), the controller 39 determines whether the button 36 is operated (S33).

When the button 36 is operated ("Y" in S33), the controller 39 turns on any or all of the first light emitters 34A11, 34A21, and 34A31 in white according to the remaining power of the earphone rechargeable battery (the left rechargeable battery 15 and the right rechargeable battery 25), thereby causing the first indicator 34A to indicate the second indication mode corresponding to the remaining power of the earphone rechargeable battery (S34).

On the other hand, when the button 36 is not operated while the first indicator 34A indicates the first indication mode ("N" in S33), the controller 39 determines whether a predetermined time has lapsed since the first indication mode was indicated on the first indicator 34A (S35).

When a predetermined time has not lapsed ("N" in S35), the indication of the first indication mode on the first indicator 34A is maintained.

On the other hand, when a predetermined time has lapsed ("Y" in S35), the controller 39 sets the indication pattern of the first indicator 34A to the turned-off pattern (S38). The charging indication operation of the present system S then returns to the processing (S31).

When the first indicator 34A indicates the second indication mode (S34), the controller 39 determines whether the button 36 is operated (S36).

When the button 36 is operated while the first indicator 34A indicates the second indication mode ("Y" in S36), the controller 39 turns on any or all of the first light emitters 34A11, 34A21, and 34A31 in blue according to the remaining power of the rechargeable battery 35, thereby causing the first indicator 34A to indicate the first indication mode corresponding to the remaining power of the rechargeable battery 35 (S32).

On the other hand, when the button 36 is not operated while the first indicator 34A is indicating the second indication mode ("N" in S36), the controller 39 determines whether a predetermined time has lapsed since the second indication mode was indicated on the first indicator 34A (S37).

When a predetermined time has not lapsed ("N" in S37), the indication of the second indication mode on the first indicator 34A is maintained.

On the other hand, when a predetermined time has lapsed ("Y" in S37), the controller 39 sets the indication pattern of the first indicator 34A to the turned-off pattern (S38). The charging indication operation of the present system S then returns to the processing (S31).

Referring now back to FIG. 11, in the processing (S2), when the present earphone 1 is not connected to the present charger 3, that is, when the connection terminals 14c and 24c are not (electrically) connected to the detection terminals 32cL and 32cR, respectively ("N" in S2), the controller 39 executes indication processing (hereinafter, referred to as "second indication processing") for a case where the present earphone 1 is not worn in a state in which the power supply cable C is not connected to the external power supply terminal 37 (S4).

Figure 13:
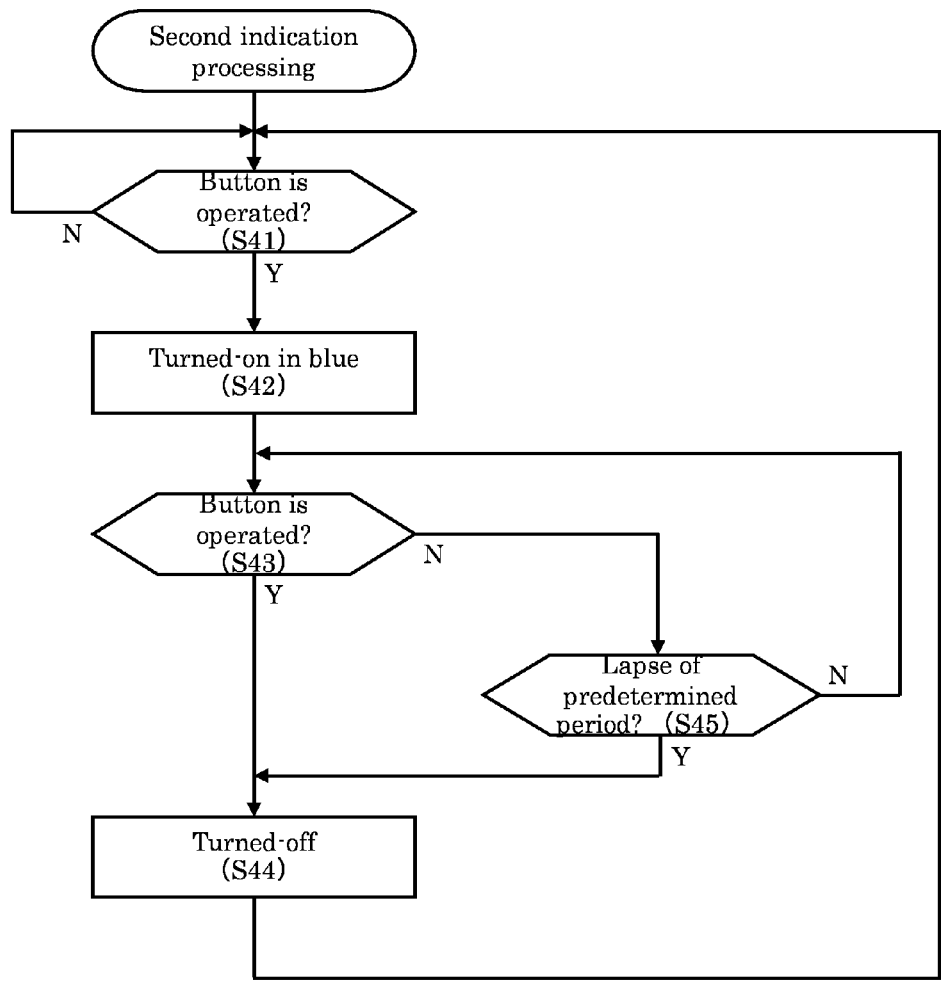
FIG. 13 is a flowchart of a second indication processing included in the flowchart of FIG. 11.

FIG. 13 is a flowchart of the second indication processing.

First, in step S41, the controller 39 determines whether the button 36 is operated.

When the button 36 is not operated ("N" in S41), the controller 39 waits for the button 36 to be operated.

On the other hand, when the button 36 is operated (Y in S41), the controller 39 turns on any or all of the first light emitters 34A11, 34A21, and 34A31 in blue according to the remaining power of the rechargeable battery 35, thereby causing the first indicator 34A to indicate the first indication mode corresponding to the remaining power of the rechargeable battery 35 (S42).

When the first indicator 34A indicates the first indication mode (S42), the controller 39 determines whether the button 36 is operated (S43).

When the button 36 is operated ("Y" in S43), the controller 39 sets the indication pattern of the first indicator 34A to the turned-off pattern (S44). The charging indication operation of the present system S then returns to the processing (S41).

On the other hand, when the button 36 is not operated while the first indicator 34A indicates the first indication mode ("N" in S43), the controller 39 determines whether a predetermined time has lapsed since the first indication mode was indicated on the first indicator 34A (S45).

When a predetermined time has not lapsed ("N" in S45), the indication of the first indication mode on the first indicator 34A is maintained.

On the other hand, when a predetermined time has lapsed ("Y" in S45), the controller 39 sets the indication pattern of the first indicator 34A to the turned-off pattern (S44). The charging indication operation of the present system S then returns to the processing (S41).

Referring now back to FIG. 11, in the processing (S1), when the detector 38 detects the connection of the power supply cable C to the external power supply terminal 37 ("Y" in S1), the controller 39 determines whether the present earphone 1 is connected to the present charger 3, that is, whether the connection terminals 14c and 24c are (electrically) connected to the detection terminals 32cL and 32cR, respectively (S5).

When the present earphone 1 is connected to the present charger 3, that is, when the connection terminals 14c and 24c are (electrically) connected to the detection terminals 32cL and 32cR, respectively ("Y" in S5), the controller 39 executes indication processing (hereinafter, referred to as "third indication processing") for a case where the present earphone 1 is worn in a state in which the power supply cable C is connected to the external power supply terminal 37 (S6).

Figure 14:
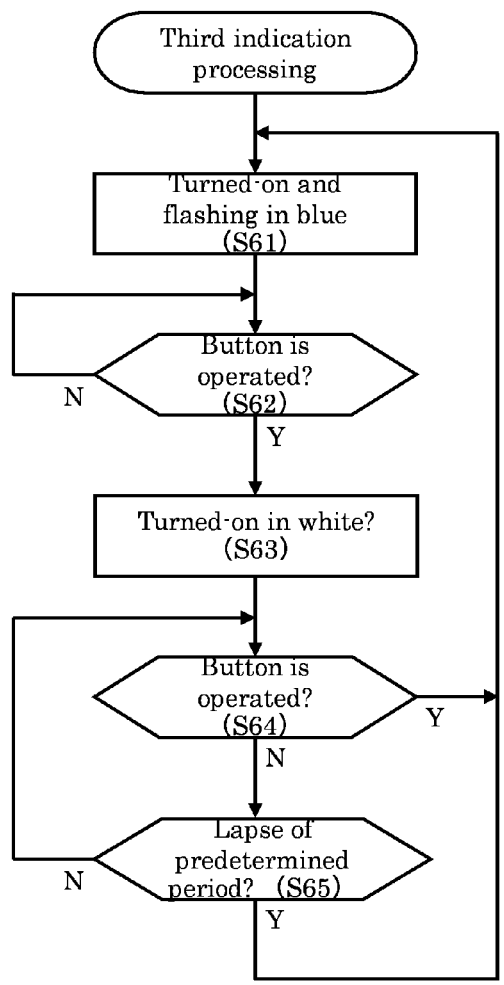
FIG. 14 is a flowchart of a third indication processing included in the flowchart of FIG. 11.

FIG. 14 is a flowchart illustrating the third indication processing.

When the power supply cable C is connected to the present charger 3 (the external power supply terminal 37), the controller 39 causes any or all of the first light emitters 34A11, 34A21, and 34A31 to turn on and flash in blue according to the remaining power of the rechargeable battery 35, thereby causing the first indicator 34A to indicate the first indication mode corresponding to the remaining power of the rechargeable battery 35 (S61).

When the first indicator 34A indicates the first indication mode (S61), the controller 39 determines whether the button 36 is operated (S62).

When the button 36 is operated ("Y" in S62), the controller 39 turns on any or all of the first light emitters 34A11, 34A21, and 34A31 in white according to the remaining power of the earphone rechargeable battery (the left rechargeable battery 15 and the right rechargeable battery 25), thereby causing the first indicator 34A to indicate the second indication mode corresponding to the remaining power of the earphone rechargeable battery (S63).

When the button 36 is not operated ("N" in S62), the controller 39 waits for the button 36 to be operated.

When the first indicator 34A indicates the second indication mode (S63), the controller 39 determines whether the button 36 is operated (S64).

When the button 36 is operated ("Y" in S64), the charging indication operation of the present system S returns to the processing (S61).

On the other hand, when the button 36 is not operated ("N" in S64) while the first indicator 34A indicates the second indication mode (S63), the controller 39 determines whether a predetermined time has lapsed since the second indication mode was indicated on the first indicator 34A (S65).

When a predetermined time has not lapsed ("N" in S65), the indication of the second indication mode on the first indicator 34A is maintained.

On the other hand, when a predetermined time has lapsed ("Y" in S65), the charging indication operation of the present system S returns to the processing (S61).

Referring now back to FIG. 11, in the processing (S5), when the present earphone 1 is not connected to the present charger 3, that is, when the connection terminals 14c and 24c are not (electrically) connected to the detection terminals 32cL and 32cR, respectively ("N" in S5), the controller 39 executes indication processing (hereinafter, referred to as "fourth indication processing") for a case where the present earphone 1 is not worn in a state in which the power supply cable C is connected to the external power supply terminal 37 (S7).

Figure 15:
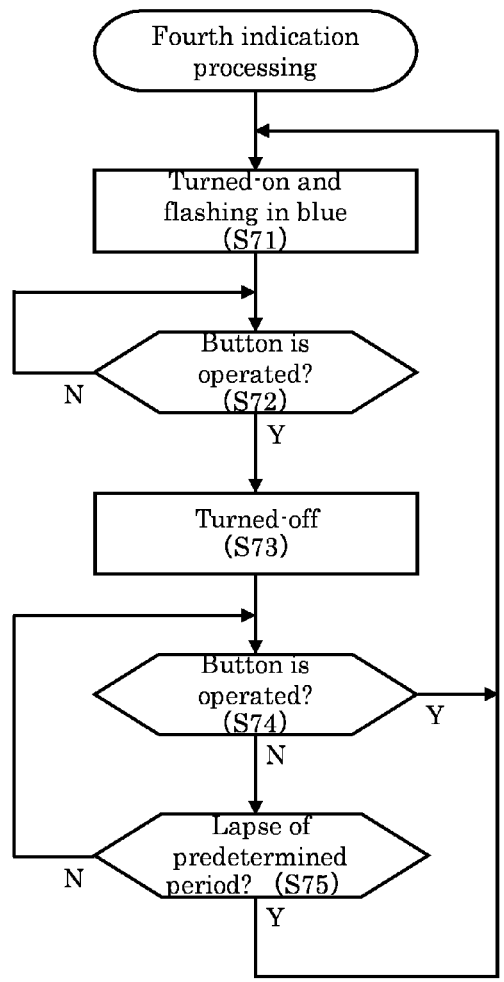
FIG. 15 is a flowchart of a fourth indication processing included in the flowchart of FIG. 11.

FIG. 15 is a flowchart illustrating the fourth indication processing.

When the power supply cable C is connected to the present charger 3 (the external power supply terminal 37), the controller 39 causes any or all of the first light emitters 34A11, 34A21, and 34A31 to turn on and flash in blue according to the remaining power of the rechargeable battery 35, thereby causing the first indicator 34A to indicate a first indication mode corresponding to the remaining power of the rechargeable battery 35 (S71).

When the first indicator 34A indicates the first indication mode (S71), the controller 39 determines whether the button 36 is operated (S72).

When the button 36 is not operated ("N" in S72), the controller 39 waits for the button 36 to be operated.

When the button 36 is operated ("Y" in S72), the connection terminals 14c and 24c are not (electrically) connected to the detection terminals 32cL and 32cR, respectively. Therefore, the controller 39 sets the indication pattern of the first indicator 34A to the turned-off pattern (S73).

The controller 39 then determines whether the button 36 is operated (S74).

When the button 36 is operated ("Y" in S74), the charging indication operation of the present system S returns to the processing (S71).

On the other hand, when the button 36 is not operated ("N" in S74), the controller 39 determines whether a predetermined time has lapsed since the turned-off pattern was indicated on the first indicator 34A (S75).

When a predetermined time has not lapsed ("N" in S75), the turned-off pattern of the first indicator 34A is maintained.

On the other hand, when a predetermined time has lapsed ("Y" in S75), the charging indication operation of the present system S returns to the process (S71).

Conclusion

According to the embodiment described above, the indication mode (first indication mode) indicating the remaining power of the rechargeable battery 35 is different from the indication mode (second indication mode) indicating the remaining power of the earphone rechargeable battery (the left rechargeable battery 15 and the right rechargeable battery 25) indicated on the first indicator 34A of the rechargeable battery 3 constituting the present system S. The first indication mode and the second indication mode are switched by the operation to the button 36 and indicated on the first indicator 34A. That is, the first indicator 34A indicates only one of the first indication mode and the second indication mode.

The first indication mode includes the indication mode (first individual indication mode) when the present charger 3 is not connected to the external power supply 200, and the indication mode (second individual indication mode) when the present charger 3 is connected to the external power supply 200. That is, the first indicator 34A indicates only one of the first individual indication mode and the second individual indication mode corresponding to the connection state between the present charger 3 and the external power source 200.

In this manner, the first indicator 34A of the present charger 3 indicates one of the first individual indication mode, the second individual indication mode, and the second indication mode while switching between the modes corresponding to the operation to the button 36. Therefore, the user of the present system S can identify the remaining power of each of the present charger 3 and the present earphone 1, and the connection state between the present charger 3 and the external power supply 200 based on the indication modes indicated on the first indicator 34A. Therefore, the visibility and design of the first indicator 34A, is higher than the conventional charger without being deteriorated.

Note that, in the embodiment described above, the left sound emitting unit 10 is configured to receive the sound signal from the sound source 100 and transmit the sound signal to the right sound emitting unit 20. However, the configuration of the earphone according to the present invention is not limited to this.

That is, in the configuration of the earphone according to the present invention, the right sound emitting unit may be configured to receive the sound signal from the sound source and transmit the sound signal to the left sound emitting unit. In this configuration, the right sound emitting unit includes the transmission circuit, and the left sound emitting unit does not includes the transmission circuit. The receiving circuit of the right sound emitting unit receives the sound signal from the sound source. The receiving circuit of the right sound emitting unit transmits the sound signal received from the sound source to the signal processing circuit and the transmission circuit of the right sound emitting unit. The transmission circuit of the right sound emitting unit transmits the sound signal transmitted from the receiving circuit of the right sound emitting unit to the receiving circuit of the left sound emitting unit. The receiving circuit of the left sound emitting unit transmits the sound signal transmitted from the transmission circuit of the right sound emitting unit to the signal processing circuit of the left sound emitting unit. The subsequent operations of the right sound emitting unit and the left sound emitting unit is the same as the operation in the embodiment described above.

In the embodiment described above, the first light emitters 34A11-34A31 are multi-color LEDs. However, the first light emitters in the present invention are not limited to multi-color LEDs. That is, for example, the first light emitters may be formed of monochromatic LEDs. In this configuration, for example, the LEDs are disposed side by side two (blue LEDs and white LEDs) at one position on the outer peripheral surface of the case of the present charger, only one of which emits light.

Further, the indication mode indicated on the first indicator is not limited to the first indication mode and the second indication mode, and may include other indication modes, for example, an indication mode for indicating an abnormal operation. The abnormal operation is, for example, a case where the present earphone is housed in the present charger in a state in which the present charger is not connected to an external power source, and the remaining power of the present charger's battery is 0%, resulting in charging to the present earphone is unable to be performed.

Further, in the embodiment described above, the controller 39 sets the indication pattern of the first indicator 34A to the turned-off pattern when the button 36 is operated while the first indicator 34A indicates the "first indication mode" in a state in which the power supply cable C is connected to the external power supply terminal 37, and the present earphone 1 is not connected to the present charger 3. Instead of this configuration, the first indicator may maintain the indication of the "first indication mode" when the button is operated while the first indicator indicates the "first indication mode".

Furthermore, the "light emission pattern" is not limited to "turned-on" "flashing", and "turned-off". That is, for example, the "light emission pattern" may be a change in luminance of the light emission of the first light emitter and the second light emitter, that is, a change in the magnitude of the luminance values.

Furthermore, in the embodiment described above, the indication pattern of the first indicator differs according to the remaining power of the rechargeable battery or the earphone rechargeable battery: "0% to less than 30%", "30% to less than 60%", "60% to less than 100%", and "100% (fully charged)". However, the range of the remaining power (the remaining power of the rechargeable battery or the earphone rechargeable battery) that varies (changes) the indication patterns in the wireless earphone system according to the present invention is not limited to this example, and can be arbitrarily set.

Further, in the embodiment described above, after the earphone rechargeable battery is fully charged (after a predetermined time has lapsed since the charging is completed), the indication modes of the second indicator 34B when the present charger 3 is receiving power supply from the external power source 200 (when the power supply cable is connected to the external power supply terminal) are different from the indication modes when the present charger 3 is not receiving power supply from the external power source 200 (when the power supply cable is not connected to the external power supply terminal). However, in the present invention, the timing at which the indication modes of the second indicator change when the power supply cable is connected to or not connected to the external power supply terminal is not limited to after the earphone rechargeable battery is fully charged (after a predetermined time has lapsed since the charging is completed). That is, for example, the indication modes of the second indicator may differ according to a case where the earphone rechargeable battery is being charged or fully charged (before a predetermined time lapses after the charging is completed). In this case, for example, in the indication modes of the second indicator, an indication color of the second indicator (a light emission color of the second light emitter) when the power supply cable is connected to the external power supply terminal is different from an indication color of the second indicator (a light emission color of the second light emitter) when the power supply cable is not connected to the external power supply terminal.

The invention claimed is:

1. A wireless earphone charger for a wireless earphone comprising a receiving circuit configured to receive a sound signal via a wireless communication line and an earphone rechargeable battery configured to charge power to be supplied to the receiving circuit, the wireless earphone charger comprising:
    a rechargeable battery configured to charge power to be supplied to the earphone rechargeable battery;
    an indicator configured to indicate a plurality of indication modes,
    a controller configured to switch the indication modes;
    a cable connection terminal to which a power supply cable for supplying power to be charged to the rechargeable battery is connected; and
    a detector configured to detect a connection of the power supply cable to the cable connection terminal, wherein
    the indication modes of the indicator include a first indication mode for indicating a remaining power of the rechargeable battery, and a second indication mode for indicating a remaining power of the earphone rechargeable battery,
    the controller is configured to switch the indication modes of the indicator based on a detection result of the detector, and
    the indicator is configured to indicate the first indication mode when the power supply cable is connected to the cable connection terminal.

2. The wireless earphone charger according to claim 1, wherein
    the first indication mode includes a plurality of individual indication modes,
    the individual indication modes include a connected individual indication mode when the power supply cable is connected to the cable connection terminal, and an unconnected individual indication mode when the power supply cable is not connected to the cable connection terminal, and
    the connected individual indication mode is different from the unconnected individual indication mode.

3. The wireless earphone charger according to claim 1, further comprising:
    a case that houses the wireless earphone; and
    a button that is operated to switch the indication modes of the indicator, wherein
    the button is a push button disposed in the case, and
    the controller is configured to switch the indication modes based on an operation to the button.

4. The wireless earphone charger according to claim 3, wherein the indicator is exposed to an outside of the case.

5. The wireless earphone charger according to claim 3, further comprising:
    a second indicator configured to indicate the remaining power of the earphone rechargeable battery; and
    a lid openable and closable with respect to the case, wherein
    the second indicator is visible from the outside of the case only when the lid is open with respect to the case.

6. The wireless earphone charger according to claim 5, wherein
    a plurality of indication modes of the second indicator include a connected indication mode when the power supply cable is connected to the cable connection terminal, and an unconnected indication mode when the power supply cable is not connected to the cable connection terminal, and
    the connected indication mode is different from the unconnected indication mode.

7. A wireless earphone charged by a wireless earphone charger, wherein
    the wireless earphone charger is the wireless earphone charger of claim 1, and
    the wireless earphone comprises:
    a receiving circuit configured to receive a sound signal via a wireless communication line,
    an earphone rechargeable battery configured to charge power to be supplied to the receiving circuit,
    a power receiving terminal configured to receive power from the wireless earphone charger, and
    a transmitting terminal configured to transmit a signal that indicates a remaining power of the earphone rechargeable battery to the wireless earphone charger.

8. A wireless earphone system comprising:
    a wireless earphone; and
    a wireless earphone charger configured to charge the wireless earphone, wherein
    the wireless earphone comprises:
    a receiving circuit configured to receive a sound signal via a wireless communication line;

an earphone rechargeable battery configured to charge power to be supplied to the receiving circuit;

a power receiving terminal configured to receive power from the wireless earphone charger; and a transmitting terminal configured to transmit a signal that indicates a remaining power of the earphone rechargeable battery to the wireless earphone charger, wherein the wireless earphone charger comprises:

a rechargeable battery configured to charge power to be supplied to the earphone rechargeable battery;

an indicator configured to indicate a plurality of indication modes;

a controller configured to switch the indication modes;

a cable connection terminal to which a power supply cable for supplying power to be charged to the rechargeable battery is connected;

a detector configured to detect a connection of the power supply cable to the cable connection terminal;

a power supply terminal; and a receiving terminal, wherein the indication modes of the indicator include:

a first indication mode for indicating a remaining power of the rechargeable battery; and a second indication mode for indicating the remaining power of the earphone rechargeable battery, wherein the controller is configured to switch the indication modes of the indicator based on a detection result of the detector, the indicator is configured to indicate the first indication mode when the power supply cable is connected to the cable connection terminal, the power supply terminal is connected to the power receiving terminal to supply power to the power receiving terminal, and the receiving terminal is connected to the transmitting terminal to receive a signal that indicates the remaining power of the earphone rechargeable battery.

9. The wireless earphone system according to claim 8, wherein the wireless earphone charger further comprises a detection terminal configured to detect a connection between the power receiving terminal and the power supply terminal, the wireless earphone further comprises a connection terminal configured to connect to the detection terminal, and the supply of power from the power supply terminal starts when the detection terminal and the connection terminal are connected.

10. The wireless earphone system according to claim 9, wherein the wireless earphone charger further comprises a second indicator, and the second indicator is configured to indicate a connection state between the detection terminal and the connection terminal, and the remaining power of the earphone rechargeable battery.

11. The wireless earphone system according to claim 8, wherein the indicator indicates the remaining power of the earphone rechargeable battery based on the signal that indicates the remaining power of the earphone rechargeable battery received by the receiving terminal.

* * * * *